(12) United States Patent
Rizzolatti et al.

(10) Patent No.: US 11,749,454 B2
(45) Date of Patent: Sep. 5, 2023

(54) POWER SUPPLY MULTI-TAPPED AUTOTRANSFORMER

(71) Applicant: Infineon Technologies Austria AG, Villach (AT)

(72) Inventors: Roberto Rizzolatti, Villach (AT); Christian Rainer, Klagenfurt (AT); Otto Wiedenbauer, Villach (AT)

(73) Assignee: Infineon Technologies Austria AG, Villach (AT)

( * ) Notice: Subject to any disclaimer, the term of this patent is extended or adjusted under 35 U.S.C. 154(b) by 748 days.

(21) Appl. No.: 16/397,237

(22) Filed: Apr. 29, 2019

(65) Prior Publication Data
US 2020/0343040 A1 Oct. 29, 2020

(51) Int. Cl.
*H01F 30/02* (2006.01)
*H01F 27/26* (2006.01)
*H01F 27/30* (2006.01)
*H01F 30/12* (2006.01)
*H02M 3/00* (2006.01)

(52) U.S. Cl.
CPC ........... *H01F 30/02* (2013.01); *H01F 27/266* (2013.01); *H01F 27/306* (2013.01); *H01F 30/12* (2013.01); *H02M 3/01* (2021.05)

(58) Field of Classification Search
CPC ...... H01F 27/306; H01F 27/266; H01F 30/02; H01F 30/12; H01F 27/2828; H01F 27/29; H01F 29/02; H01F 17/04; H01F 27/006; H01F 41/02; H02M 1/0058; H02M 1/0064; H02M 7/4815; H02M 3/33569; H02M 3/33523; Y02B 70/10
See application file for complete search history.

(56) References Cited

U.S. PATENT DOCUMENTS

| | | | |
|---|---|---|---|
| 2,579,789 A | 12/1951 | Bussard | |
| 5,363,068 A * | 11/1994 | Georger | H03H 7/42 348/E7.051 |
| 2010/0085129 A1* | 4/2010 | Shuto | H03H 7/38 333/32 |

(Continued)

FOREIGN PATENT DOCUMENTS

| | | | |
|---|---|---|---|
| JP | 09289125 A | * | 11/1997 |
| SU | 803020 A1 | * | 2/1981 |

OTHER PUBLICATIONS

Block Transformatoren Elektronik Gmbh: "Technical Details Autotransformer SAT100", Feb. 1, 2004 (Feb. 1, 2004), pp. 1-2 XP55894047.

(Continued)

*Primary Examiner* — Tuyen T Nguyen
(74) *Attorney, Agent, or Firm* — Armis IP Law, LLC

(57) ABSTRACT

An apparatus comprises: first windings, second windings, a magnetic core, and multiple tap nodes. The first windings are primary windings of a multi-tapped autotransformer. The second windings are secondary windings of the multi-tapped autotransformer. The first windings and the second windings are wrapped around the magnetic core, the second windings disposed in a series connection between the first windings. The multiple tap nodes providing coupling of the first windings and the second windings to a power supply circuit such as a switched-capacitor converter.

36 Claims, 26 Drawing Sheets

(56) References Cited

U.S. PATENT DOCUMENTS

2010/9220505    9/2010  Tsuruya
2012/0062147 A1    3/2012  Fan

OTHER PUBLICATIONS

EP Office Action, EP 20 171 445.8, dated Mar. 1, 2022, pp. 1-7.
Siemens Catalogue: "Autotransformer SITAS 4AM3442-5FN00-0EA0", Feb. 22, 2019(Feb. 22, 2019), pp. 1-3, XP055893604,Retrieved from the Internet: URL:https://asset.conrad.media10/add/160267/c1/-/en/001751675DS00/datasheet-1751675-siemens-4am34425fn000ea0-autotransformer-1-x-525-v-500-v-475-v-1-x-24-100-va.pdf [retrieved on Feb. 21, 2022].
EP Search Report, EP 20171445.8, dated Aug. 14, 2020, pp. 7.

\* cited by examiner

| | N1 | N2 |
|---|---|---|
| First case | Entire turn (i.e. 1,2,3...) | Entire turn (i.e. 1,2,3...) |
| Second case | Not Entire turn (i.e. 0.5,1.5,2.5...) | Not Entire turn (i.e. 0.5,1.5,2.5...) |
| Third case | Entire turn (i.e. 1,2,3...) | Not Entire turn (i.e. 0.5,1.5,2.5...) |
| Fourth case | Not Entire turn (i.e. 0.5,1.5,2.5...) | Entire turn (i.e. 1,2,3...) |

FIG. 13

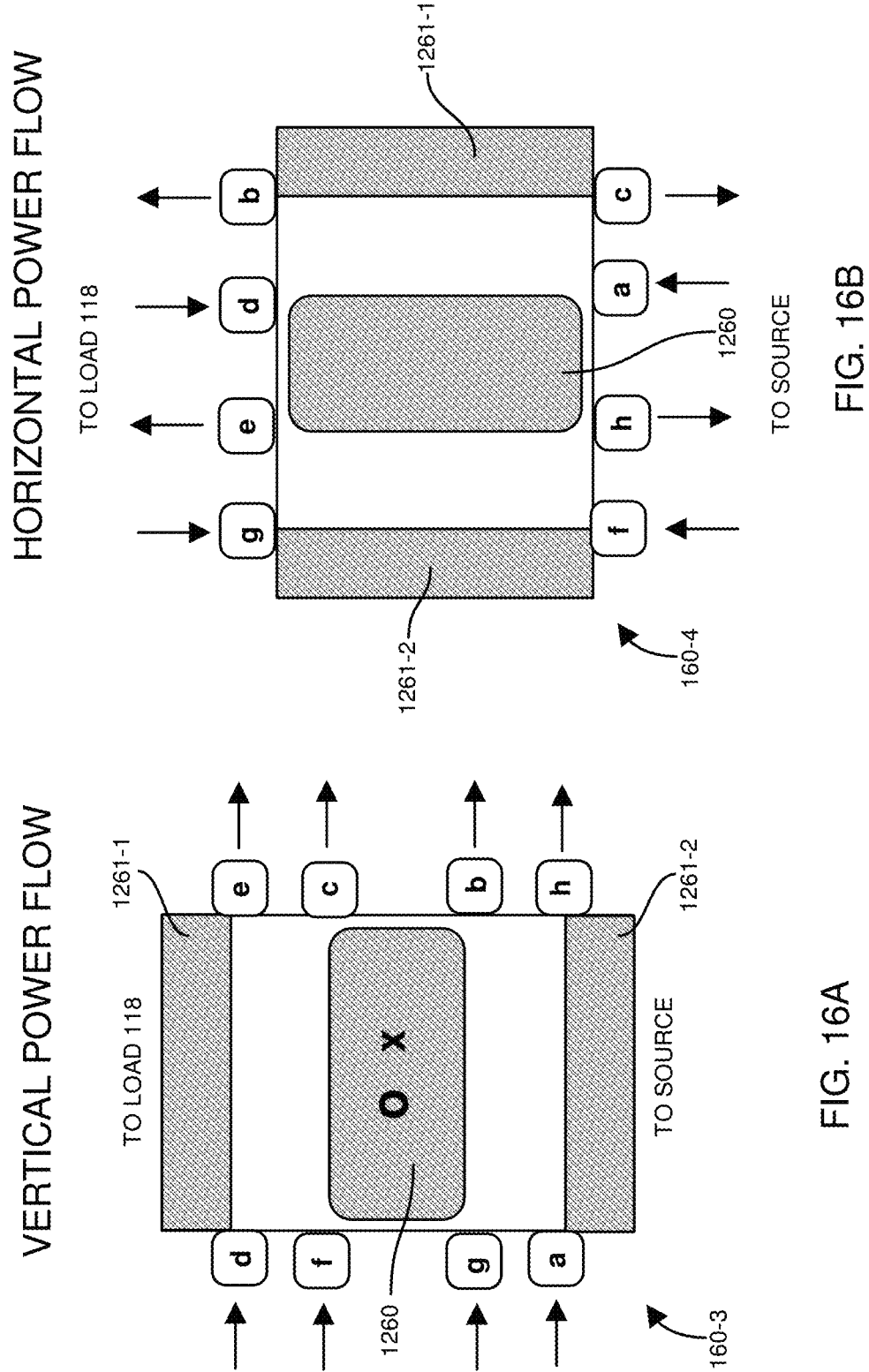

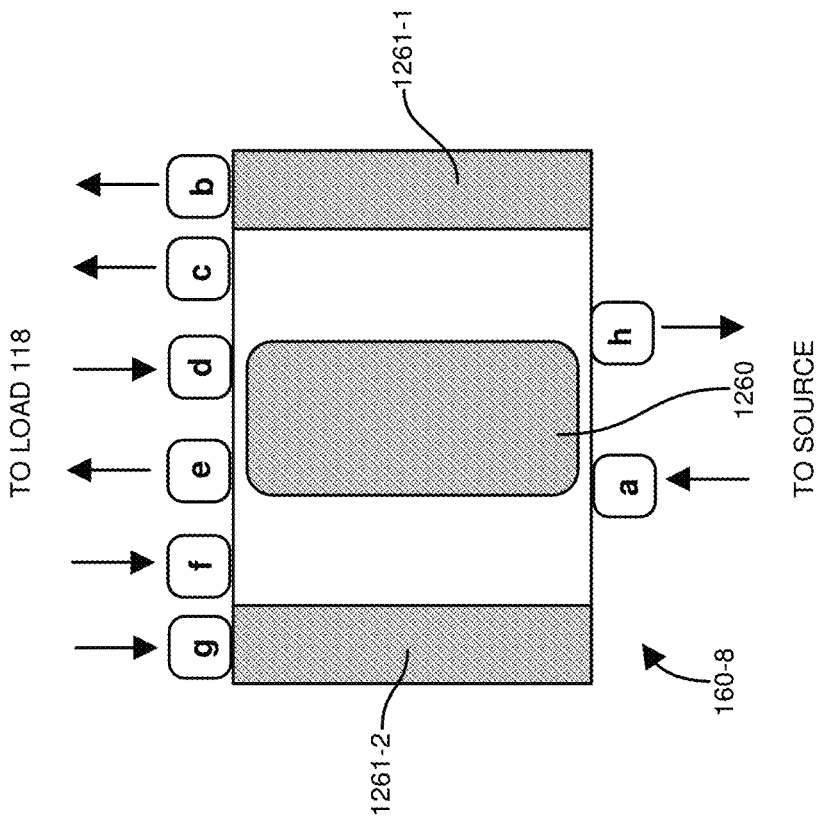
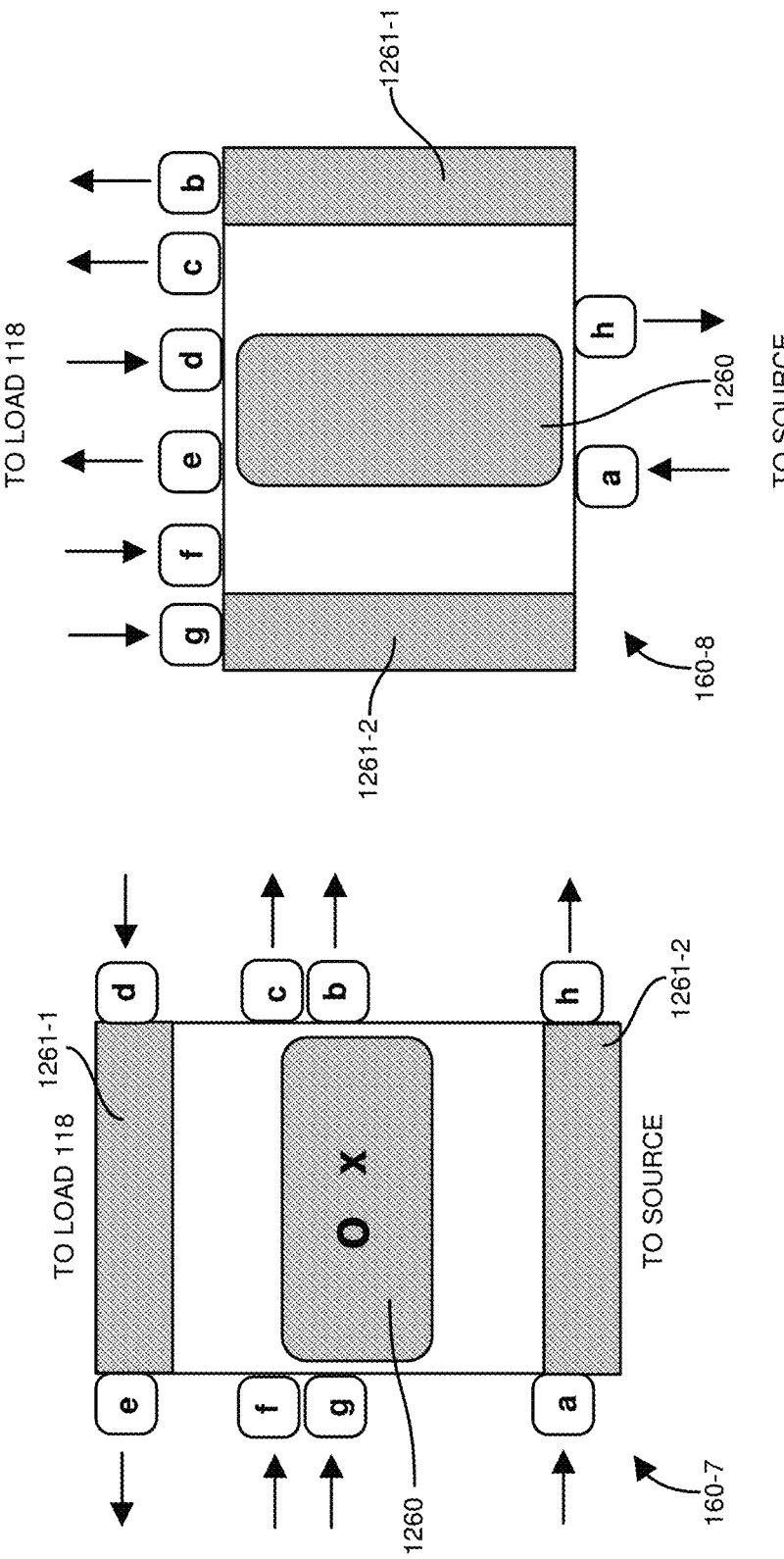
FIG. 18B
FIG. 18A

POWER SUPPLY MULTI-TAPPED AUTOTRANSFORMER

BACKGROUND

As its name suggests, a conventional switched-capacitor DC-DC converter converts a received DC input voltage into a DC output voltage.

In one conventional application, the input voltage to the conventional switched-capacitor converter falls in a range between 40 VDC to 60 VDC. In such an instance, switches in the switched-capacitor converter are controlled to transfer charge stored in capacitors, resulting in conversion of the input voltage such as a 48 VDC to an output voltage such as 12 VDC for a so-called 4:1 switched-capacitor converter. In other words, a conventional switched-capacitor converter can be configured to convert a 48 VDC voltage into a 12 VDC voltage.

To avoid so-called hard switching in the switched-capacitor converter, the switches in the switched-capacitor converter are preferably switched when there is near zero voltage across them and near zero current flowing through them.

The undesirable hard switching in a conventional switched-capacitor converter may be mitigated by placing an individual inductor in series with a respective capacitor in each stage of the switched-capacitor converter. This results in a resonant (or semi-resonant) switching converter. Such a switched-capacitor converter is sometimes termed a switched tank converter (STC). The resonant tank circuit formed by a series connection of an inductor and capacitor has an associated resonant frequency that is based upon the inductance and capacitance of these components.

Switching of the switches in the conventional switched-capacitor converter at the respective resonant frequency results in so-called zero current switching (ZCS), which reduces switching losses and provides good power conversion efficiency.

A multi-tapped autotransformer is a specific type of electrical transformer sometimes used in power supply applications. A multi-tapped autotransformer has only one continuous winding. In a multi-tapped autotransformer, portions of the same winding can be used to function as both primary and secondary sides of the multi-tapped autotransformer.

BRIEF DESCRIPTION

This disclosure includes the observation that power conversion efficiency of power supplies can be improved. For example, to this end, embodiments herein include novel magnetic devices, transformer devices, and methods of fabricating same to provide efficient generation of a corresponding output voltage.

More specifically, according to one embodiment, an apparatus (such as a multi-tapped autotransformer) comprises: first windings, second windings, a magnetic core, and multiple tap nodes. The first windings are primary windings of the multi-tapped autotransformer. The second windings are secondary windings of the multi-tapped autotransformer. The first windings and the second windings are wrapped around the magnetic core of the multi-tapped autotransformer. In one embodiment, the second windings are disposed in a series connection between the first windings. The multiple tap nodes of the multi-tapped autotransformer provide coupling of the first windings and the second windings to a power supply circuit such as a switched-capacitor converter or other suitable type of power converter circuit.

In accordance with further embodiments, the first windings include at least a first primary winding and a second primary winding; a fabricator connects the second windings in series between the first primary winding and the second primary winding. In one embodiment, a combination of the first windings, the second windings, and the magnetic core are components of a multi-tapped autotransformer device (hardware).

In yet further embodiments, such as when the multi-tapped autotransformer as described herein is implemented in a power supply circuit, each of the first winding and the second winding are operable to receive energy supplied from one or more input voltage sources. The core of the multi-tapped autotransformer as described herein conveys the energy from the first windings (primary windings) to the second windings (secondary windings) to produce an output voltage to power a respective load.

In accordance with further embodiments, the multiple tap nodes of the multi-tapped autotransformer apparatus as described herein includes first tap nodes and second tap nodes. In one embodiment, the first tap nodes are disposed opposite the second tap nodes with respect to a body of the magnetic core of the multi-tapped autotransformer. The first tap nodes are coupled to the first windings; the second first tap nodes are coupled to the second windings. In one embodiment, a set of tap nodes coupled to the second windings are disposed at an axial end of a body of the magnetic core such as a location of the magnetic core in which the second windings (such as a common node) are connected in series with respect to each other.

Note that each of the first windings and second windings can include any integer or non-integer number of turns. For example, in accordance with a first embodiment, each of the first windings includes an integer (or near integer) number of turns; each of the second windings includes an integer (or near integer) number of turns. In accordance with a second embodiment, each of the first windings includes a non-integer number of turns; each of the second windings includes an integer (or near integer) number of turns. In accordance with a third embodiment, each of the first windings includes a non-integer number of turns; each of the second windings includes a non-integer number of turns as well.

In accordance with yet further embodiments, the magnetic core of the multi-tapped autotransformer as described herein includes multiple magnetic cores around which the first windings and second windings are wound. In one nonlimiting example embodiment, each of the first windings is wound around a combination of the multiple magnetic cores; each of the second windings is wound around only a different (single) magnetic core of the multiple magnetic cores.

In still further embodiments, the first windings optionally include a first set of primary windings and a second set of primary windings; each of the first set of primary windings is wound (wrapped) around a combination of the multiple magnetic cores; each of the second primary windings is wound around a combination of the multiple magnetic cores. The second windings optionally include a first set of secondary windings and a second set of secondary windings; each of the secondary windings in the first set wound around only a first (single) magnetic core of the multiple magnetic cores; each of the secondary windings in the second set is wound around only a second (single) magnetic core of the multiple magnetic cores.

In accordance with further embodiments, the first set of primary windings and the second set of primary windings are connected in series with the first set of secondary windings and the second set of secondary windings. Yet further, each of the primary windings in the first set of primary windings is connected in series; each of the primary windings in the second set of primary windings is connected in series; each of the secondary windings in the first set of secondary windings is connected in parallel with each other; and each of the secondary windings in the second set of secondary windings is connected in parallel with each other.

In accordance with further embodiments, the power supply as described herein includes a unique multi-tapped autotransformer in which the first primary winding and the second primary winding of the multi-tapped autotransformer are connected in series via connectivity through the secondary winding. More specifically, the first primary winding is connected in series with the secondary winding; the second primary winding is connected in series with secondary winding as well.

The multi-tapped autotransformer as described herein can be configured to include one or more secondary winding (such as a tapped secondary winding, or multiple secondary windings connected in series), which is inductively coupled to the first and second primary windings. In one embodiment, the first primary winding, the second primary winding, and the secondary winding(s) are magnetically coupled to each other through a core of the magnetic core. If desired, the secondary winding(s) can be center tapped to facilitate producing the output voltage from an output of the center-tapped (secondary) winding.

In accordance with further embodiments, the power supply as described herein includes an inductor connected across nodes of the primary winding of the multi-tapped autotransformer. In yet further embodiments, the inductor is connected in parallel with the secondary winding(s) of the multi-tapped autotransformer.

In yet further embodiments, the inductor provides zero voltage switching (ZVS) of switches in the switched-capacitor converter. Additionally, or alternatively, note that the zero voltage switching capability can be provided by the magnetizing inductance associated with the multi-tapped autotransformer.

These and other more specific embodiments are disclosed in more detail below.

Note that any of the resources as discussed herein can include one or more computerized devices, apparatus, hardware, etc., execute and/or support any or all of the method operations disclosed herein. In other words, one or more computerized devices or processors can be programmed and/or configured to operate as explained herein to carry out the different embodiments as described herein.

Yet other embodiments herein include software programs to perform the steps and/or operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate generation of an output voltage to power a load. The instructions, when executed by computer processor hardware, cause the computer processor hardware (such as one or more co-located or disparately located processor devices or hardware) to: receive a magnetic core; wrap first windings around the magnetic core, the first windings being primary windings; wrap second windings around the magnetic core, the second windings being secondary windings, the second windings disposed in a series connection between the first windings; and couple multiple nodes of the multi-tapped autotransformer to the first windings and the second windings.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

Note further that although embodiments as discussed herein are applicable to fabrication of a novel multi-tapped autotransformer and controlling operation of a switched-capacitor converter, the concepts disclosed herein may be advantageously applied to any other suitable voltage converter topologies or electronic circuits.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention (s), the reader is directed to the Detailed Description section (which is a summary of embodiments) and corresponding figures of the present disclosure as further discussed below.

BRIEF DESCRIPTION OF THE DRAWINGS

FIG. 13 is an example diagram illustrating a table specifying different numbers of turns (of wire) to fabricate windings on a multi-tapped autotransformer according to embodiments herein.

FIGS. 16A and 16B are example diagrams illustrating different top views of a multi-tapped autotransformer according to embodiments herein.

FIGS. 18A and 18B are example diagrams illustrating different top views of a multi-tapped autotransformer according to embodiments herein.

Figure 1:
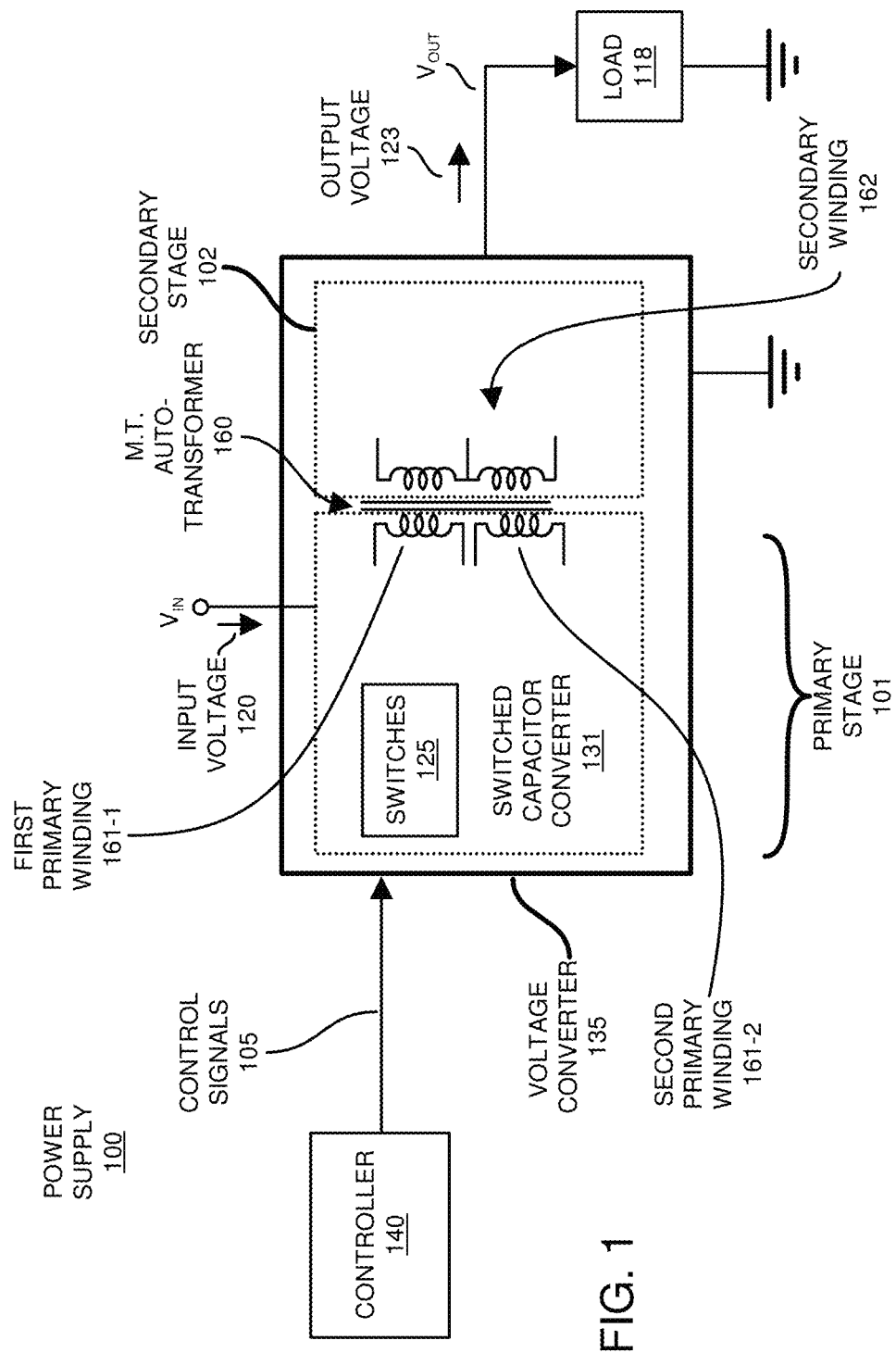
FIG. 1 is an example diagram illustrating a power supply including a switched-capacitor converter and multi-tapped autotransformer according to embodiments herein.

The foregoing and other objects, features, and advantages of embodiments herein will be apparent from the following more particular description herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Now, more specifically, FIG. 1 is an example diagram illustrating a power supply including a switched-capacitor converter and multi-tapped autotransformer according to embodiments herein.

As shown in this example embodiment, power supply 100 (such as an apparatus, electronic device, etc.) includes a controller 140 and voltage converter 135. The voltage converter 135 includes a primary stage 101 and a secondary stage 102.

Primary stage 101 includes a switched-capacitor converter 131 comprising switches 125, first primary winding 161-1, and second primary winding 162-2 of multi-tapped autotransformer 160. Note that the multi-tapped autotransformer 160 is shown by way of a non-limiting example embodiment and can be instantiated as any suitable device such as a transformer, transformer device, transformer apparatus, etc. Secondary stage includes secondary winding 162 of multi-tapped autotransformer 160 and related circuitry to generate output voltage 123 (Vout, such as a generally a DC voltage). Secondary windings 162 comprising first secondary winding 162-1 and second secondary winding 162-2.

Note that each of the resources as described herein can be instantiated in a suitable manner. For example, each of the controller 140, switched-capacitor converter 131, multi-tapped autotransformer 160, etc., can be instantiated as or include hardware (such as circuitry), software (executable instructions), or a combination of hardware and software resources.

During operation, controller 140 produces control signals 105 (such as one or more pulse width modulation signals) that control states of respective control switches 125 in switched-capacitor converter 150.

As further shown, the switched-capacitor converter 150 receives the input voltage 120 (Vin, such as a DC input voltage) supplied to the switched-capacitor converter 131. As previously discussed, the multi-tapped autotransformer 160 includes a first primary winding 161-1 and a second primary winding 162-1. In one embodiment, the primary windings 161 are at least inductively coupled to the secondary winding 162. In accordance with further embodiments, the primary windings 161 are connected in series with the secondary windings 162.

As further discussed herein, controller 140 of the power supply 100 controllably switches multiple capacitors and corresponding resonant circuit paths including the primary windings 161 of multi-tapped autotransformer 160 to convey energy from the input voltage (Vin) through the primary winding 161 to the secondary winding 162 to produce the output voltage 123.

Figure 2:
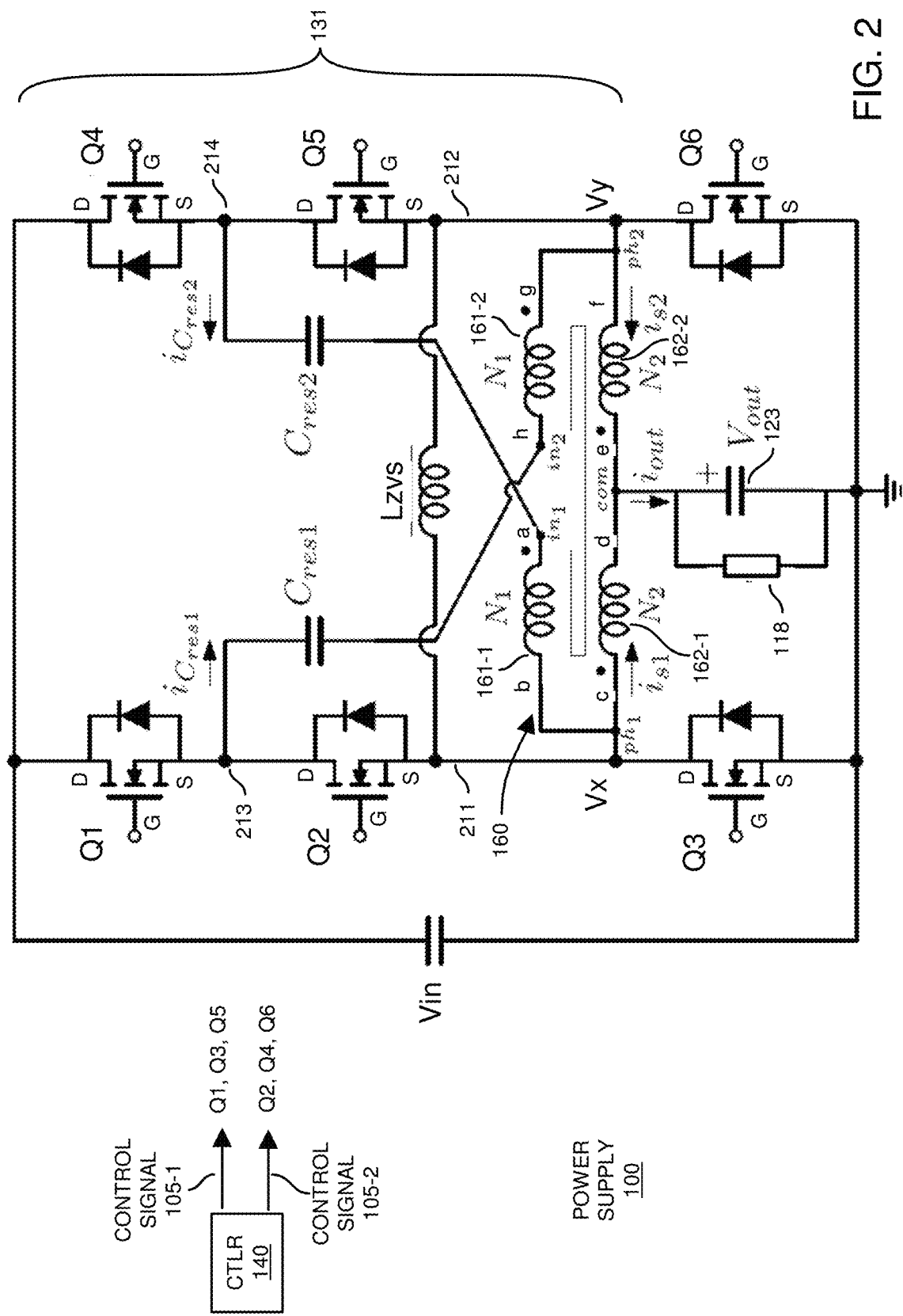
FIG. 2 is an example diagram illustrating a controller and a more detailed rendition of a power supply including a switched-capacitor converter and a multi-tapped autotransformer according to embodiments herein.

FIG. 2 is an example diagram illustrating a switched-capacitor converter according to embodiments herein.

As shown, the power supply 100 includes voltage source Vin, switched-capacitor converter 131, and multi-tapped autotransformer 160.

The switched-capacitor converter 131 (apparatus such as hardware, circuitry, etc.) includes multiple switches Q1, Q2, Q3, Q4, Q5, and Q6 (such as field effect transistors or any other suitable type of switch). Additionally, the switched-capacitor converter 150 includes multiple circuit components including inductor Lzvs, capacitor Cres1, and capacitor Cres2.

Further in this example embodiment, the multi-tapped autotransformer 160 includes primary winding 161-1 (such as N1 turns), primary winding 161-2 (such as N1 turns), secondary winding 162-1 (such as N2 turns), and secondary winding 162-2 (such as N2 turns). The number of windings (N1, N2, etc.) associated with the primary winding 161 and/or the secondary winding 162 can be any suitable value and vary depending on the embodiment.

In one embodiment, a combination of the primary windings and secondary windings of multi-tapped autotransformer 160 are connected in series. For example, primary winding 161-1 is connected in series with secondary winding 162-1; secondary winding 162-1 is connected in series with secondary winding 162-2; secondary winding 162-2 is connected in series with primary winding 161-2.

In accordance with further embodiments, the secondary winding 162 (such as a tapped secondary winding, or multiple secondary windings connected in series) is inductively coupled to the first primary winding 161-1 and second primary winding 161-2. In other words, as shown, the first primary winding 161-1, the second primary winding 161-2, and the secondary winding(s) 162 are magnetically coupled to each other. If desired, the secondary winding 162 can be a center tapped winding facilitating generation of the output voltage 123 from a respective output of the center-tapped winding.

Further in this example embodiment, the drain node (D) of switch Q1 and the drain node (D) of switch Q4 are connected to the input voltage source Vin.

Further, the source node (S) of the switch Q1 is coupled to the drain node (D) of the switch Q2 (node 213). The source node (S) of the switch Q4 is coupled to the drain node (D) of the switch Q5 (node 214). The source node (S) of the switch Q2 is coupled to node 211. The source node (S) of switch Q5 is coupled to node 212.

Capacitor Cres1 is connected between node 213 and a respective node of primary winding 161-2. Capacitor Cres2 is connected between node 214 and a respective node of primary winding 161-1.

Inductor Lzvs is coupled in parallel to primary winding 161 and is disposed between node 211 and 212.

The drain (D) of switch Q3 is connected to node 211; the source (S) of switch Q3 is connected to ground. The drain (D) of switch Q6 is connected to node 212; the source (S) of switch Q6 is connected to ground.

The center tap (com node) of the secondary winding 162 outputs current Iout and corresponding output voltage 123 to drive load 118 (a.k.a., Ro).

In one embodiment, the magnitude of the output voltage 123 is Vin/8. Thus, if Vin=48 VDC, the magnitude of the output voltage 123 is 6 volts. However, as discussed herein, settings of components in the power supply 100 can be adjusted to produce an output voltage 123 (Vout) of any suitable value. In general the output voltage 123, Vout=Vin* (N2/(2*(2N2+N1))), where N1=the number of turns on the primary windings 161 and N2 is the number of turns on each of the secondary windings 162.

In one embodiment, N1 is defined as the turns of each primary windings whilst N2 is defined as the turns of each secondary windings; in which case Vout=Vin*N2/(2* (2*N2+N1)). As further shown, during operation, the controller 110 produces control signals 105-1 and 105-2.

Further in this example embodiment, control signal 105-1 generated by the controller 140 drives gates (G) of respective switches Q1, Q3, and Q5. Accordingly, control signal 105-1 controls a state of each of the switches Q1, Q3, and Q5.

Control signal 105-1 drives respective gates (G) of switches Q1, Q3, and Q5. Accordingly, control signal 105-2 controls a state of each of the switches Q2, Q4, and Q6.

Note that each of the switches as described herein can be any suitable devices such as (Metal Oxide Semiconductor) field effect transistors, bipolar junction transistors, etc.

The settings of capacitors Cres1 and Cres2 can be any suitable value. In one embodiment, the voltage converter 135 as described herein provides better performance when Cres1=Cres2, and works well even if Cres1≠Cres2.

The inductor Lzvs can be any suitable value. See the discussion below in text associated with FIG. 4 indicating an example setting of inductor Lzvs to provide zero voltage switching to switches in the power supply 100.

Referring again to FIG. 2, in one embodiment, additional inductance (such as inductor Lzvs) in parallel with the multi-tapped autotransformer 160 is optionally present to achieve zero voltage switching (ZVS) for one or more switches Q1-Q6. As further discussed below, the Lzvs inductance alternatively can be integrated in the multi-tapped autotransformer 161 (such as with gaps in the respective core or using core with lower permeability).

As previously discussed, switches in power supply 100 are divided into two switch groups: the first switch group including switches Q1, Q3, and Q5 controlled by respective control signal 105-1, and a second switch group including switches Q2, Q4, and Q6, controlled by respective control signal 105-2, which is generally a 180 degrees phase shift with respect to timing of control signal 105-1.

In one embodiment, the pulse width modulation of control signals 105 is approximately 50% to obtain the minimum RMS current.

The magnitude of the output voltage 123 depends on the turns (# of windings ratio N1/N2 of the primary winding to the secondary winding). In one embodiment, the switching frequency does not change directly the magnitude of the output voltage, but in general is changing it because the losses are increasing or decreasing based on the difference between Fres and Fsw, where Fres is the resonant frequency of the tank formed by Cres1 or Cres2 and the leakage of the multi-tapped autotransformer when Cres1=Cres2.

Embodiments herein include taking advantage of the leakage inductance, Lk, of the multi-tapped autotransformer 160 to (soft) charge the capacitors Cres1 and Cres2 during different control cycles. For example, in one embodiment, the capacitors Cres1 and Cres2 function as flying capacitors, enabling use of lower voltage field effect transistors at the primary side (switched-capacitor converter 131) in comparison to a classic LLC topology.

Note that a further benefit of the switched-capacitor converter 131 as described herein is the symmetric behavior of such a circuit. For example, as further discussed herein, via the implementation of power supply 100: i) the switched-capacitor converter 131 is powered almost continuously from the input supply Vin at different times in a respective control cycle, reducing the input current ripple as compared to other technologies, ii) in the equivalent resonant tank switched circuit paths of the switched-capacitor converter (such as first resonant circuit path including capacitor Cres1 and primary winding 161-2 and second resonant circuit path including capacitor Cres2 and primary winding 161-1), both resonant caps are resonating with the leakage inductance Lk of the multi-tapped autotransformer. In one embodiment, if Cres1≠Cres2 the resonant transitions are unbalanced, which actually is not an issue for operation. In general, if the difference is the maximum difference between Cres1 and Cres2 based on the tolerance (i.e. ±10%±20%), the converter is still running with high efficiency. In such an instance the converter is still working well because of ZVS operation.

Note further that one enabler of high efficiency and high-power density of the proposed power supply 100 is the ability to implement lower voltage rating field effect transistors and the implementation of Class II ceramic capacitors (such as capacitors Cres1 and Cers2), which inherently offer high capacitance density.

Moreover, as previously discussed, the additional inductor, Lzvs, provides the inductive energy to ensure ZVS transition for all field effect transistors in the switched-capacitor converter 131 such as during all switching conditions. For example, energy stored in the inductor Lzvs supplies charge to parasitic capacitors of the respective switches during dead times such as between time T1 and T2, between time T3 and T4, and so on as further discussed below.

Figure 3:
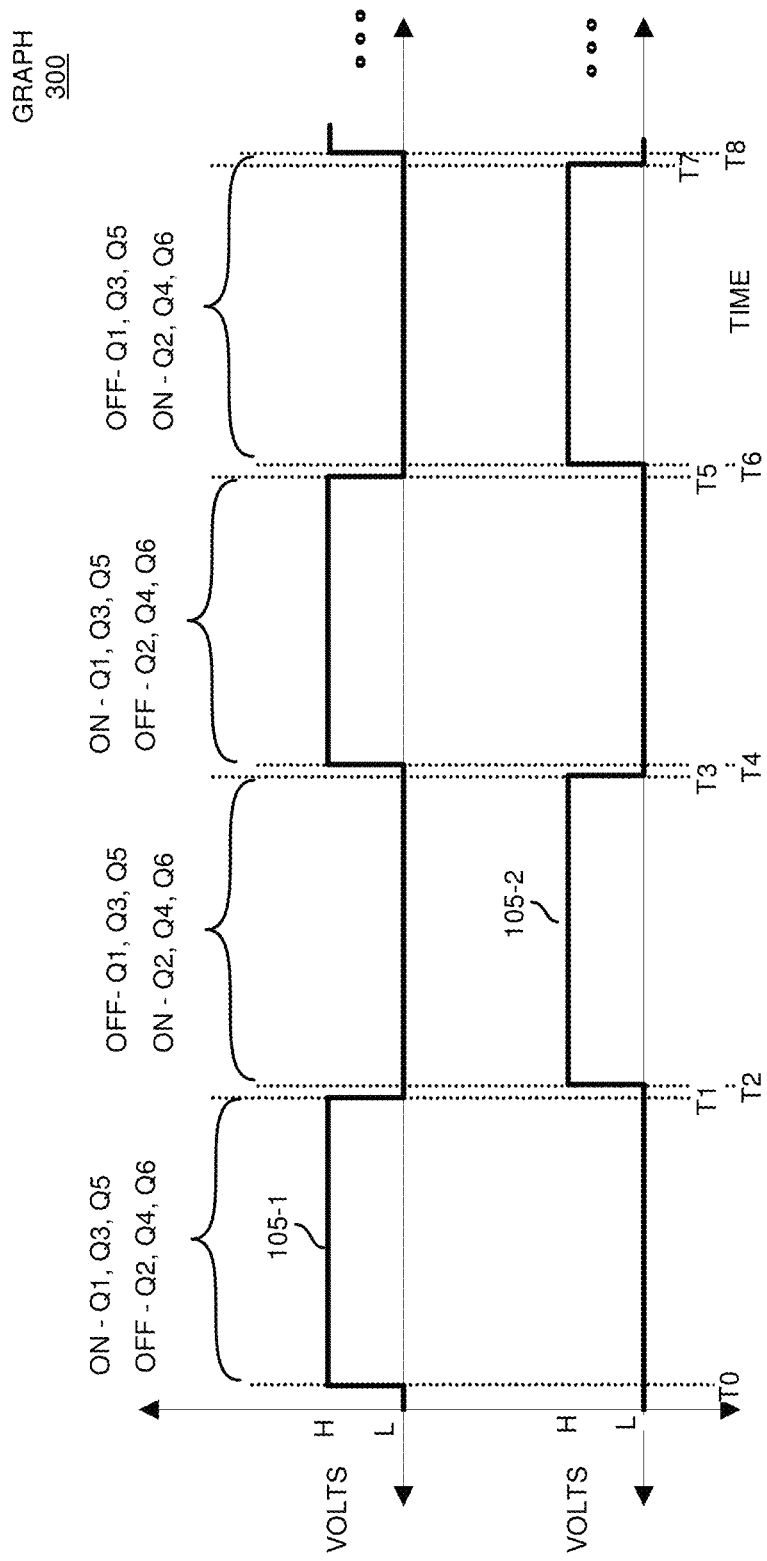
FIG. 3 is an example timing diagram illustrating timing of control signals according to embodiments herein.

FIG. 3 is an example diagram illustrating generation of controls signals that control a switched-capacitor converter and a respective voltage converter according to embodiments herein.

In general, as shown in graph 300, the controller 110 produces the control signal 105-2 to be an inversion of control signal 105-1. A pulse width of each control signal is approximately 49% or other suitable pulse width modulation value.

Between time T0 and time T1, when the control signal 105-1 (at a logic high) controls the set of switches Q1, Q3, and Q5, to an ON state (low impedance or short circuit), the control signal 105-2 (logic lo) controls the set of switches Q2, Q4, and Q6, to an OFF state (open circuit).

Conversely, between time T2 and time T3, when the control signal 105-2 (logic high) controls the set of switches Q2, Q4, and Q6, to an ON state, the control signal 105-1 (logic low) controls the set of switches Q1, Q3, and Q5, to an OFF state.

Note that the duration between times T1 and time T2, the duration between time T3 and time T4, duration between T5 and T6, etc., represents so-called dead times during which each of the switches (Q1-Q6) in the power supply 100 is deactivated to the OFF state (high impedance or open circuit).

As further shown, the control signals 105 are cyclical. For example, the settings of control signals 105 for subsequent cycles is the same as those for the cycle between time T0 and time T4. More specifically, the settings of control signals 105 produced by the controller 110 between time T3 and time T7 is the same as settings of control signals 105 between time T0 and time T3, and so on.

In one embodiment, the controller 110 controls the frequency of the control signals (period is time between T0 and time T4) can be generated at any suitable frequency.

Additionally, as previously mentioned, the controller 110 controls the pulse duration of the control signals 105 to be around 49% depending on dead time, although the control signals 105 can be generated at any suitable pulse width modulation value.

A magnitude of the output voltage 123 depends on the multi-tapped autotransformer 160 turns ratio (N1/N2). The ratio between the input voltage Vin and output voltage Vout is given by the following equation:

$$Vin/Vout=4+[(2*N1)/N2]$$

Thus, the power converter as described herein is scalable to different conversion ratios by designing only the ratio between N1 and N2, which actually leads to claim a new family of unregulated hybrid dc-dc converter with different possible ratios Vin/Vout (such as 5 to 1, 6 to 1, 7 to 1, 8 to 1, . . . ).

Note that further embodiments herein take advantage from the leakage inductance of the multi-tapped autotransformer 160 to soft charge the capacitors Cres1 and Cres2, which act as flying capacitors, enabling use of lower voltage related MOSFETs in the primary side (primary stage 101) in comparison with conventional (classic) LLC converter topologies. Switches Q1 and Q4 block a portion of the input voltage which can be defined by the following equation:

$$Vmax(Q1,Q4)=Vin/2+Vout*N1/N2$$

During operation, switch Q2 and switch Q5 have to block the entire input voltage Vin, while switch Q3 and Q6 have to block 2*Vout.

As previously discussed, another benefit of the power supply as described herein is its symmetric behavior, which provides a benefit that the dynamic load 118 is powered any time from the input supply Vin during each phase, reducing the current/voltage ripple on the output voltage 123.

Note further that the magnitude of the output voltage 123 (Vout) depends on the turns (# of windings N1 and N2 associated with the primary windings 161 and the secondary windings 162; N1 is the turns of each primary winding and N2 is the turns of each secondary windings. In such an instance, there exists a following relation between input and output: Vin/Vout=4+[(2*N1)/N2]) and the switching frequency of the control signals 105. These can be selected to be any suitable settings. Accordingly, attributes of the switched-capacitor converter 120 can be modified to convert any input voltage level to a respective desired (such as unregulated) output voltage level.

Figure 4:
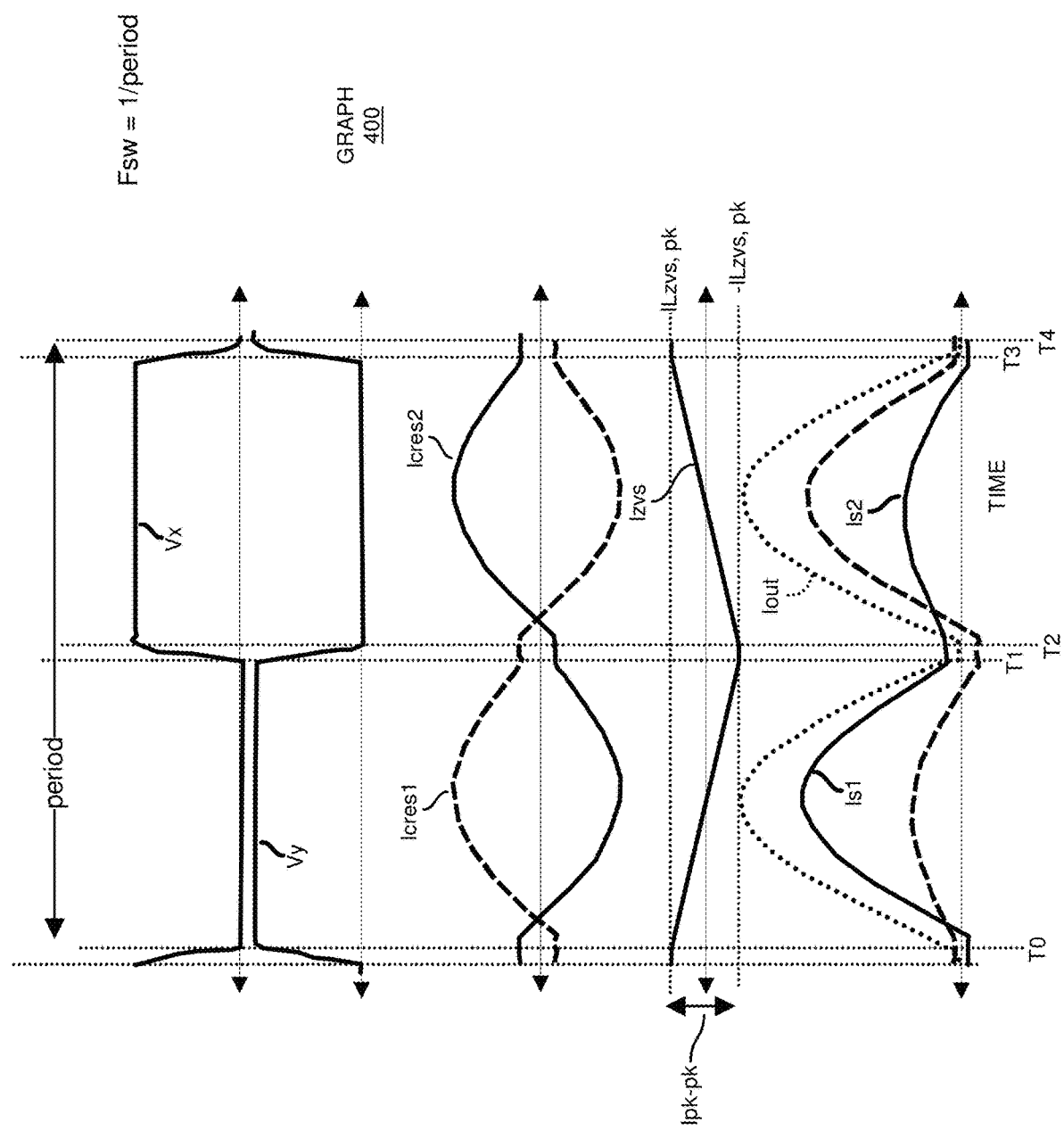
FIG. 4 is an example diagram illustrating a timing diagram of control signals and output signals according to embodiments herein.

FIG. 4 is an example diagram illustrating a timing diagram of output signals according to embodiments herein.

In this example embodiment, as previously discussed, the voltage Vx indicates the voltage at node 211 between the primary winding 161-1 and the secondary winding 162-1; voltage Vy indicates the voltage at node 212 of the primary winding 161-2 and secondary winding 162-2.

Icres1 represents current through the series combination of capacitor Cres1 and primary winding 161-2; Icres2 represents current though the series combination of capacitor Cres2 and primary winding 161-1.

Izvs represents current through the inductor Lzvs.

Is1 represents current through the secondary winding 162-1; Is2 represents current though the secondary winding 162-2.

Iout (summation of current Is1 and current Is2) represents the output current (Iout) supplied by the center tap of secondary winding 162 of the multi-tapped autotransformer 160 to a dynamic load 118. Between time T0 and time T1, when the resonant circuit path including capacitor Cres 1 and primary winding 161-2 are coupled to input voltage via activation of switch Q1, the corresponding generated current Is1 contributes a majority of the current to produce the current Iout. Conversely, between time T2 and time T3, when the resonant circuit path including capacitor Cres 2 and primary winding 161-1 are coupled to input voltage via activation of switch Q2, the corresponding generated current Is2 contributes a majority of the current to produce the current Iout.

Figure 5:
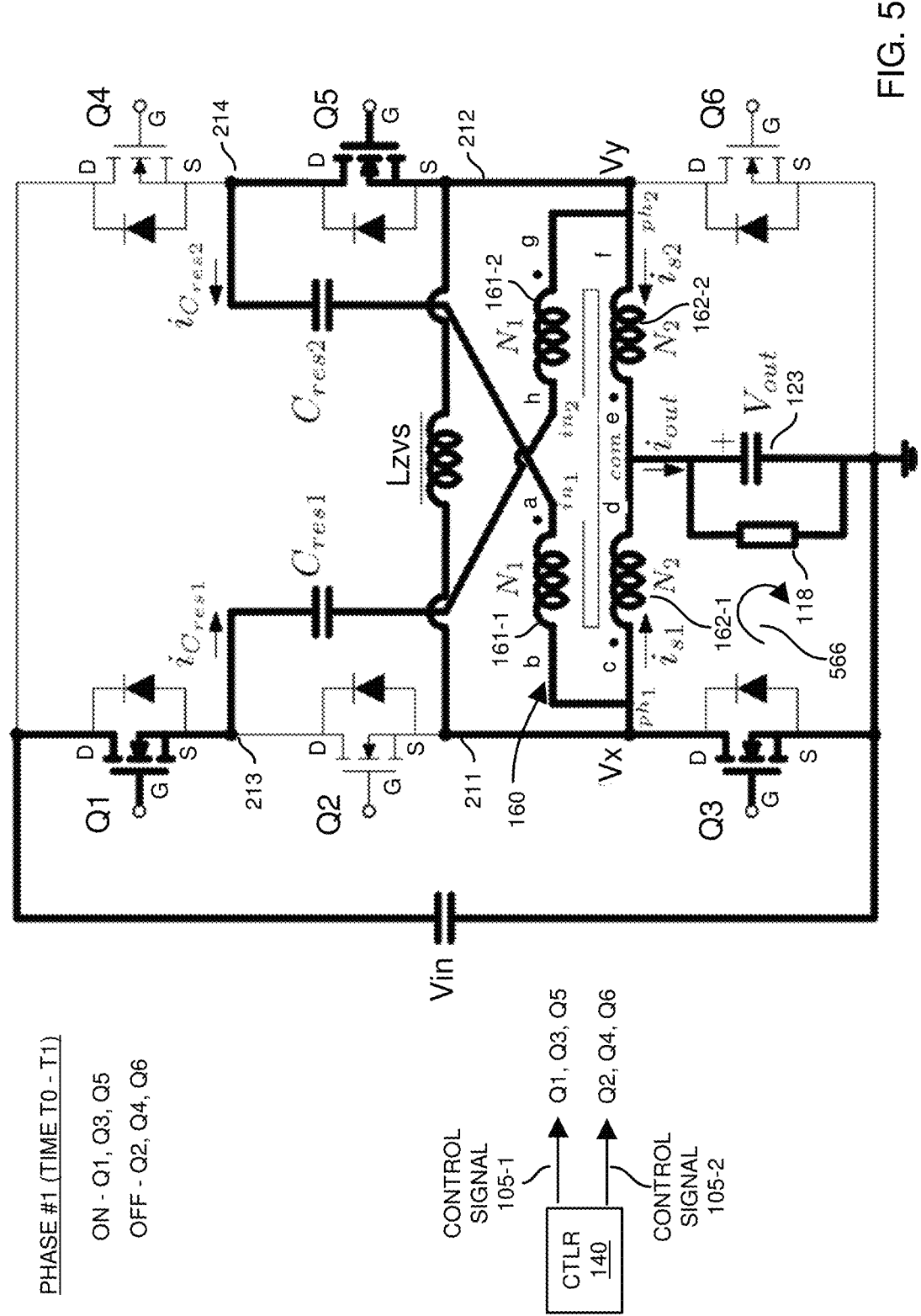
FIG. 5 is an example diagram illustrating a first mode of controlling switches in a switched-capacitor converter according to embodiments herein.

FIG. 5 is an example diagram illustrating a first mode (phase #1) of controlling switches in a switched-capacitor converter and voltage converter according to embodiments herein.

For the phase #1, between time T0 and time T1, switches Q2, Q4, and Q6 are turned OFF; switches Q1, Q3, and Q5 are turned ON in ZVS and in zero current switching (ZCS) and the first resonant mode transition takes place between capacitor Cres1 and the leakage inductance of the multi-tapped autotransformer, whilst the second resonant mode transition takes place between capacitor Cres2 and the leakage inductance of the multi-tapped autotransformer 160.

In such an instance, during phase #1, capacitor Cres1 is soft-charged from the input voltage source Vin while capacitor Cres2 is soft-discharged.

More specifically, as previously discussed, the primary winding 161 of the multi-tapped autotransformer 160 includes a first node 211 and a second node 212. During time T0 to time T1 (a first resonant frequency mode), the controller 140 creates a first switched circuit path connecting the capacitor Cres1 to the input voltage Vin; the controller 140 further creates a second switched circuit path by connecting the capacitor Cres2 to node 212. As previously discussed, in such an instance, the capacitor Cres1 is soft charged via input voltage Vin, the capacitor Cres2 (flying capacitor charged to Vin/2) is soft discharged. Accordingly, during phase #1, to a different degree, both resonant circuit paths contribute to generation of the output voltage 123 that powers the load 118.

When capacitances are substantially equal such as capacitance of Cres1=capacitance of Cres2, the RMS (Root Mean Square) current through each capacitor is approximately the same. If perfect balance is present between the actual resonant current through capacitors Cres1 and Cres2, then i(Cres1)(t)=−i(Cres2)(t), and considering i(Cres1)(t)=Ires (t) it follows that Is2(t)=2*Ires(t). In this scenario, the following equation are valid in phase #1:

$$N1*Ires(t)+N1*Ires(t)=N2*Is1(t)-N2*Is2(t)$$

which can be written as:

$$Is1(t)=[(2*N1)/N2+2]*Ires(t) \text{ as shown in FIG. 4.}$$

In such phase #1 the converter presents in general two resonant modes based on the actual value of Cres1 and Cres2. For example Cres1 is facing a resonant current with resonant switching defined by Fres1=1/(2*pi*sqrt(Cres1*Lk)) where Lk is leakage of the multi-tapped autotransformer.

Whilst Cres2 is facing a resonant current with resonant switching defined by Fres2=1/(2*pi*sqrt(Cres2*Lk)) where Lk is leakage of the multi-tapped autotransformer.

Figure 6:
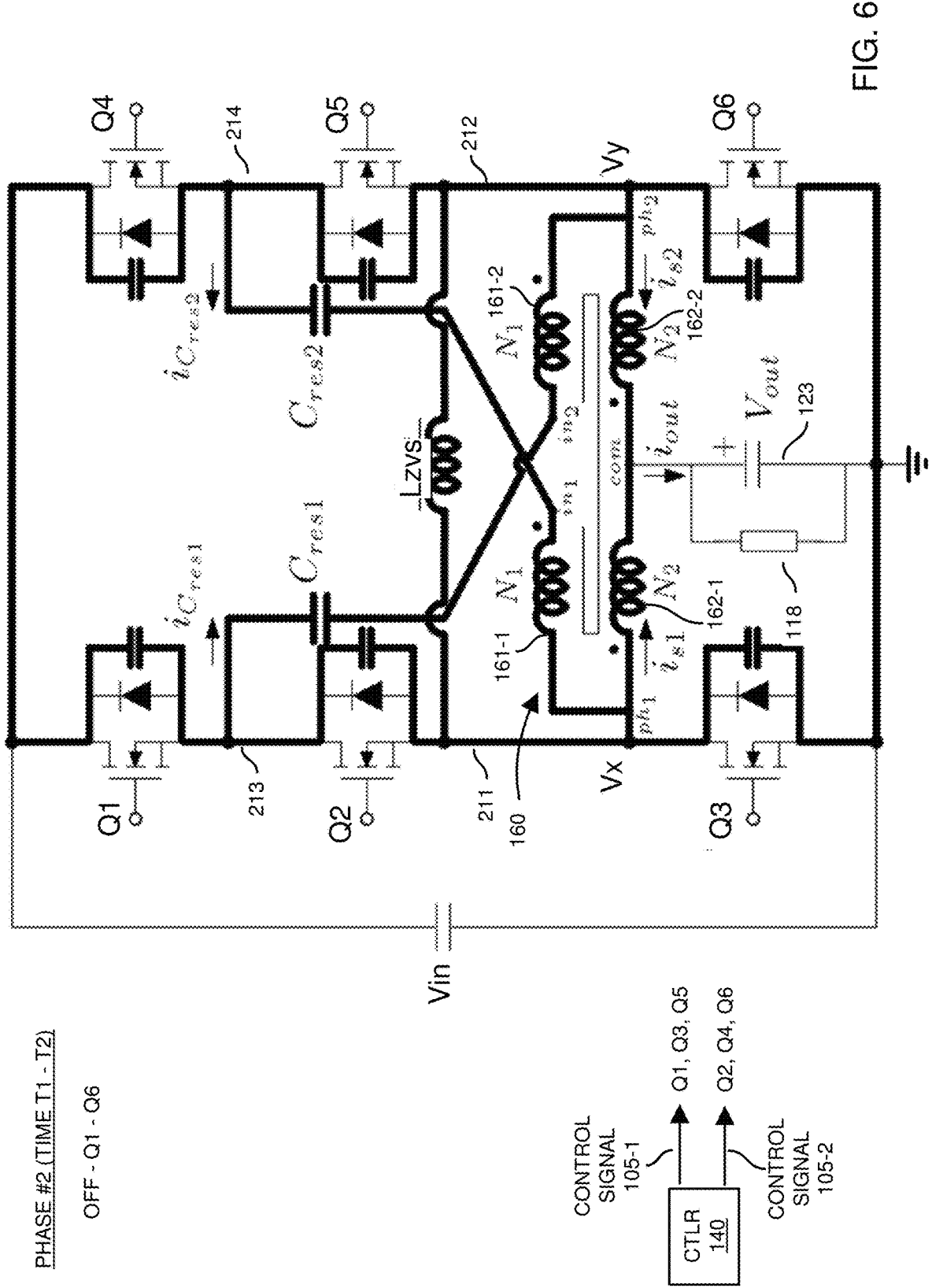
FIG. 6 is an example diagram illustrating a dead time or deactivation of switches in a switched-capacitor converter according to embodiments herein.

FIG. 6 is an example diagram illustrating a dead time or deactivation of all switches in a switched-capacitor converter and voltage converter according to embodiments herein.

Between time T1 and time T2, controller 140 turns OFF switches Q1, Q3 and Q5. The parasitic capacitance of Q1 is charged to Vin/2+Vout*N1/N2; switch Q3 is charged to 2*Vout; switch Q5 is charged at the input voltage Vin, whilst the parasitic capacitance of switches Q2, Q4 and Q6 are discharged to zero, using the inductive energy stored in the inductor Lzvs. When the capacitance of switch Q2, Q4, and Q6 are discharged to zero, their body diodes start to conduct to enable ZVS turn on. The current Izvs(T1) that enables ZVS operation, is denoted as i(Lzvs,pk)) as shown in FIG. 4 which is given by the following equation:

$$I_{L_{zvs,pk}} = \frac{V_{out}}{2 * L_{zvs} * f_{sw}}$$

In one embodiment, the value of Lzvs is strongly dependent on the application and basically it depends on the input voltage, output voltage, and the MOSFET used in the application.

Figure 7:
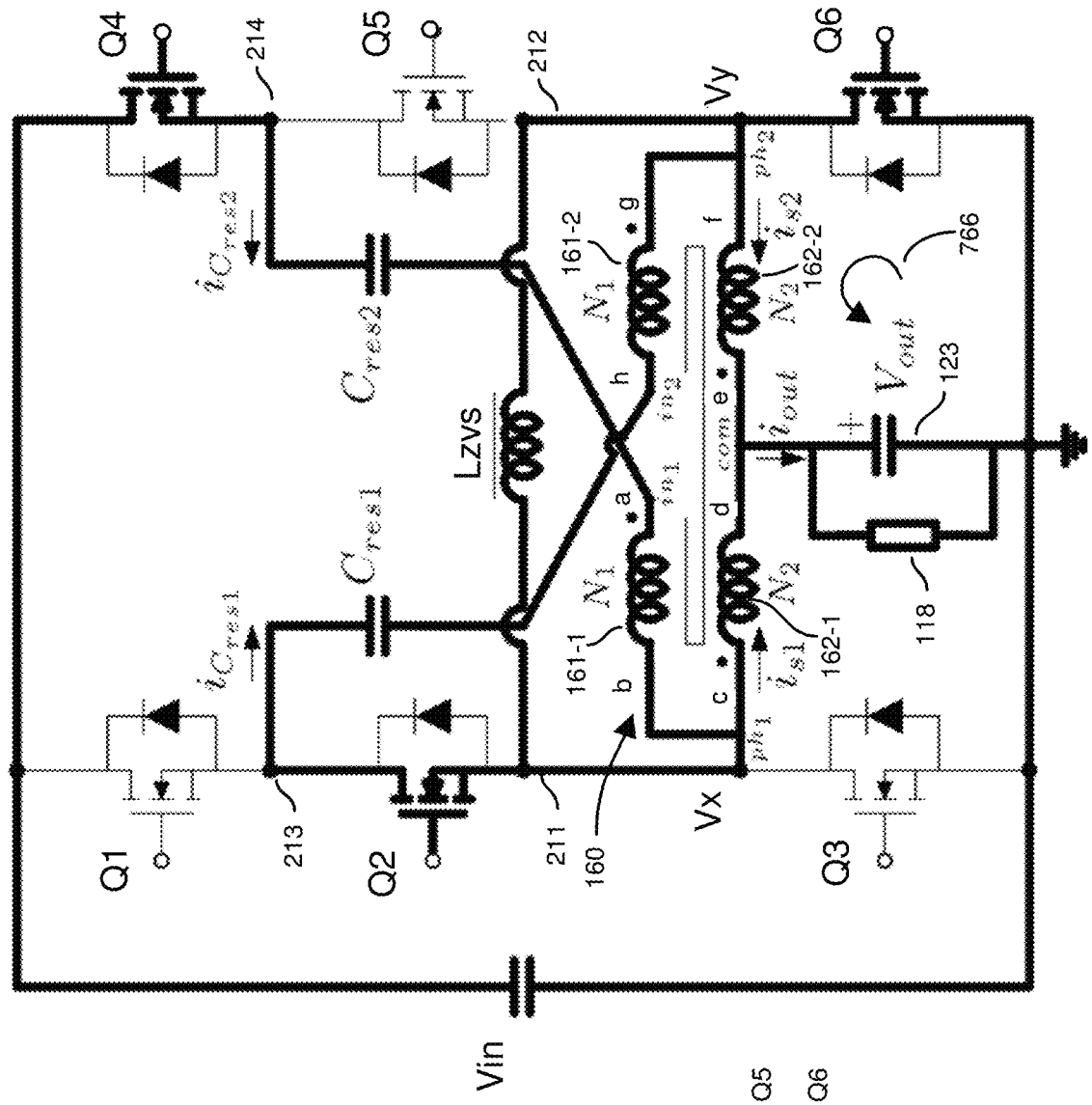
FIG. 7 is an example diagram illustrating a second mode of controlling switches in a switched-capacitor converter according to embodiments herein.

FIG. 7 is an example diagram illustrating a second mode (a.k.a., phase #3) of controlling switches in a switched-capacitor converter and voltage converter according to embodiments herein.

For the phase #3, between time T2 and time T3, at t=T2 witches Q2, Q4 and Q6 are turned ON in ZVS and ZCS; switches Q1, Q3, and Q5 are OFF. In ZVS and in zero current switching (ZCS) and the first resonant mode transition takes place between capacitor Cres1 and the leakage inductance of the multi-tapped autotransformer, whilst the second resonant mode transition takes place between capacitor Cres2 and the leakage inductance of the multi-tapped autotransformer 160.

In such an instance, during phase #3, capacitor Cres2 is soft-charged from the input voltage source Vin while capacitor Cres1 is soft-discharged. More specifically, as previously discussed, the primary winding 161 of the multi-tapped autotransformer 160 includes a first node 211 and a second node 212. During time T2 to time T3 (a second resonant frequency mode), the controller 140 creates a first switched circuit path connecting the capacitor Cres2 to the input voltage Vin via switch Q4; the controller 140 further creates a second switched circuit path by connecting the capacitor Cres1 to the node 211. As previously discussed, in such an instance, the capacitor Cres1 (flying capacitor) is soft discharged, the capacitor Cres2 (charged to Vin/2) is soft charged. Accordingly, during phase #3, to a different degree, both resonant circuit paths contribute to generation of the output voltage 123 that powers the load 118.

When capacitances are substantially equal such as capacitance of Cres1=capacitance of Cres2, the RMS (Root Mean Square) current through each capacitor is approximately the same. If perfect balance is present between the actual resonant current through capacitors Cres1 and Cres2, then ICres1(t)=−ICres2(t), and considering ICres1(t)=Ires(t), it follows that Is1(t)=2*Ires(t). In this scenario, the following equation are valid in phase #3:

$$N1*Ires(t) - N1*Ires(t) = N2*Is1(t) - N2*Is2(t)$$

which can be written as:

$$Is2(t) = [(2*N1)/N2 + 2]*Ires(t) \text{ as shown in FIG. 4.}$$

This converter includes two separate resonant tank circuits. In such an instance, there are two resonant frequencies based on the actual value of Cres1 and Cres2. For example Cres1 is facing a resonant current with resonant switching defined by Fres1=1/(2*pi*sqrt(Cres1*Lk)) where Lk is leakage of the multi-tapped autotransformer.

Whilst Cres2 is facing a resonant current with resonant switching defined by Fres2=1/(2*pi*sqrt(Cres2*Lk)) where Lk is leakage of the multi-tapped autotransformer.

Figure 8:
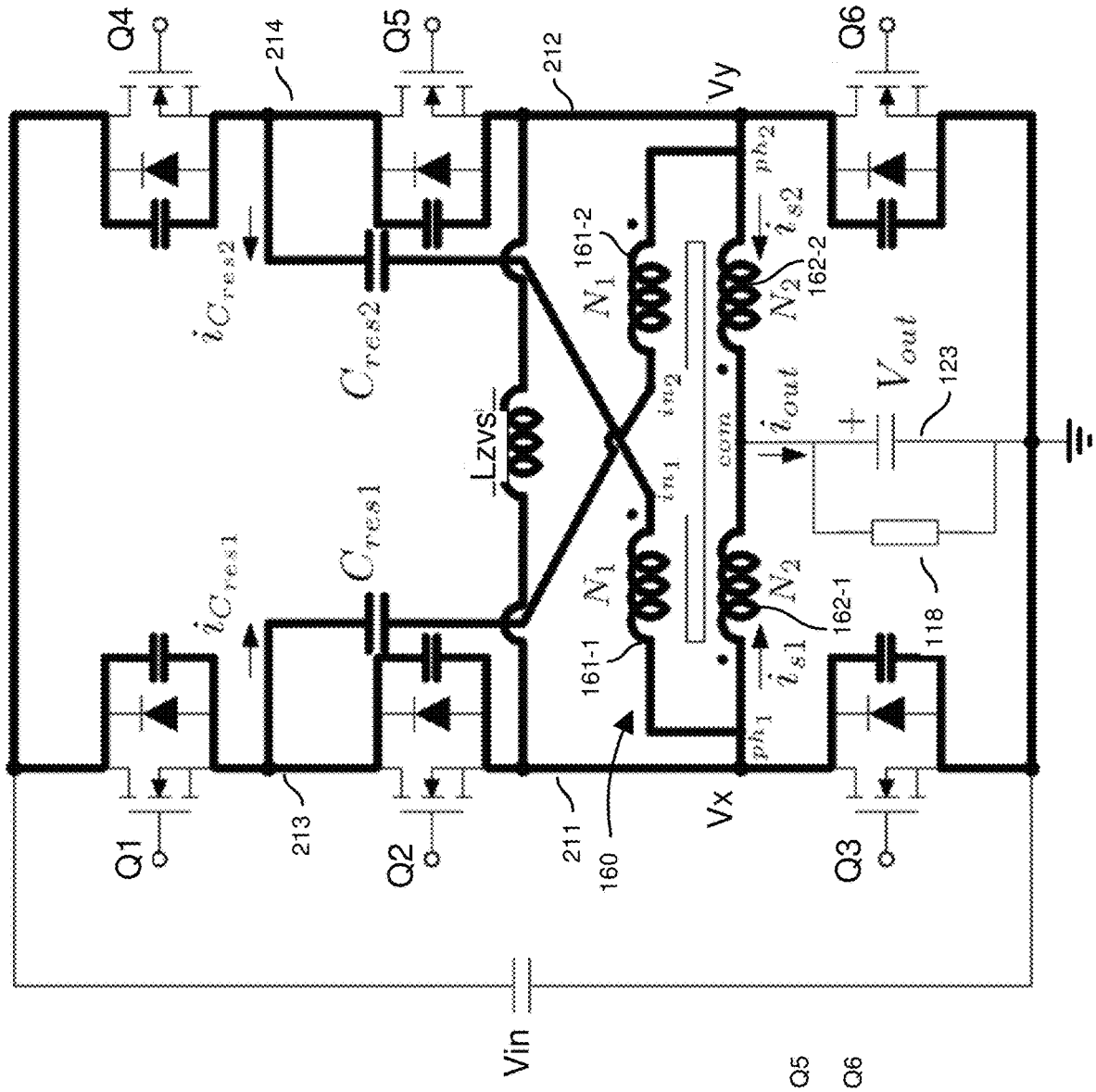
FIG. 8 is an example diagram illustrating a dead time or deactivation of switches in a switched-capacitor converter according to embodiments herein.

FIG. 8 is an example diagram illustrating a dead time or deactivation of all switches in a switched-capacitor converter and voltage converter according to embodiments herein.

Between time T3 and time T4, controller 140 turns OFF switches Q2, Q4, and Q6 and the parasitic capacitance of switch Q4 is charged to Vin/2+Vout*N1/N2, switch Q2 is charged at the input voltage, Vin, switch Q6 is charged to 2*Vout, whilst the parasitic capacitance of switches Q1, Q3, and Q5 are discharged to zero.

When the capacitance of switches Q1, Q3, and Q5 are discharged to zero, their respective body diodes start to conduct to enable ZVS turn on. The current that enables ZVS is Izvs(t3) which correspond with −IL(zvs,pk). Thus, IL(zvs,pk) is a good index to establish when ZVS condition is achieved for all switches.

At t=T4, switches Q1, Q3, and Q5 are turned ON in ZVS and ZCS (Zero Current Switching), concluding the switching period (i.e., time T0 to time T4).

As highlighted in the operation of the power supply 100 in different phases (in FIGS. 5-8), the power supply 100 converter achieves ZVS conditions in all load conditions regardless of the tolerance of the components.

In one embodiment, if the expected ZVS condition is designed for the worst case (Vin=V(in,min) and Lzvs+tolerance(Lzvs)), the converter as described herein can achieve soft switching operation in all load conditions for all input voltages and load conditions, which renders embodiments herein suitable for mass production. Moreover, as previously reported, the multi-tapped autotransformer of the voltage converter 135 as described herein can be implemented with a matrix multi-tapped autotransformer resulting in lower windings and core losses.

Figure 9:
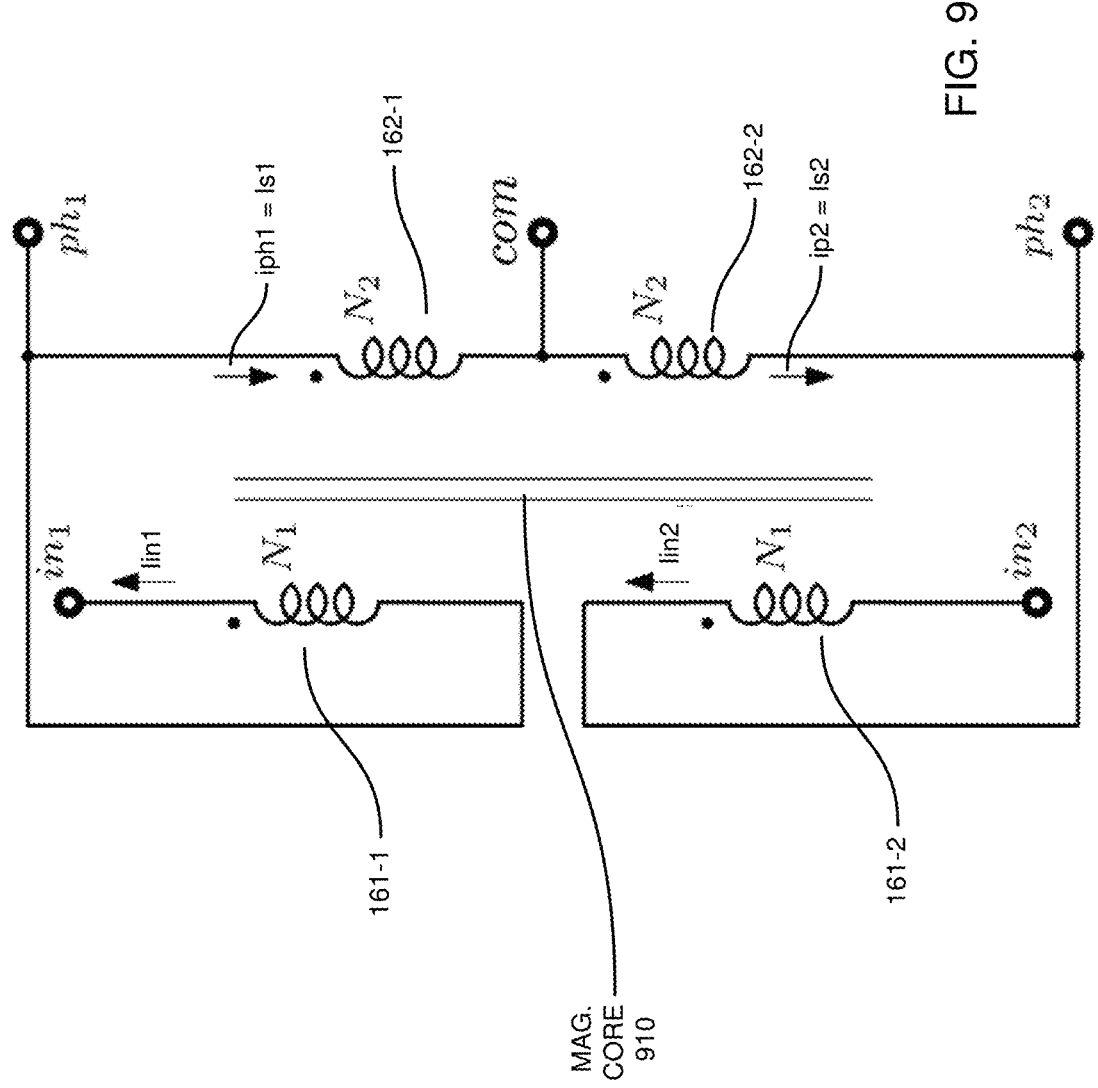
FIG. 9 is an example diagram illustrating details of a multi-tapped autotransformer according to embodiments herein.

FIG. 9 is an example diagram illustrating details of a multi-tapped autotransformer according to embodiments herein.

One benefit of implementing the multi-tapped autotransformer 160 in the voltage converter 135 (FIG. 2) is high efficiency and high power density, enabling use of lower voltage rating MOSFETs (such as for switches Q1-Q6) comparing with a classic LLC converter and enabling the choice of implementing Class II ceramic capacitors (such as for Cres1 and Cres2), which inherently offer high capacitance density.

Moreover, as previously discussed, the additional inductor Lzvs (alternatively implemented via the magnetizing inductance of the multi-tapped autotransformer) provides the inductive energy to ensure ZVS transition for all switches (such as MOSFETs) in the voltage converter 135.

In addition to these benefits, another benefit of the multi-tapped autotransformer 160 (such as multi-tapped autotransformer) is the inherent lower windings losses in comparison to classic LLC converters; the overall conduction stresses for all FETs (such as switches Q1-Q6) are reduced, providing a higher reliability power.

As shown in FIG. 2 and FIG. 9, one example of a proposed multi-tapped autotransformer 160 comprises: 4 windings. All windings are arranged in series, starting from terminal node in1 (node a) and ending at terminal node in2 (node h). More specifically, a combination of primary winding 161-1 (between node a and node b), secondary winding 162-1 (between node c and node d), secondary winding 162-2 (between node e and node f), and primary winding 161-2 (between node g and node h) are connected in series between node in1 and node in2. Multi-tapped autotransformer 160 includes so-called taps at node in1, tap node ph1, tap node com, tap node ph2, and node in2.

The discussion below provides a further understanding associated with the magnetic structure of an embodiment of the multi-tapped autotransformer 160.

More specifically, in this example embodiment of FIG. 9, the four windings of the multi-tapped autotransformer 161 are wound on or around a common magnetic core 910, forming an multi-tapped autotransformer. As previously discussed, the windings of multi-tapped autotransformer 160 include: i) a first group of windings (any suitable number of windings) formed by the primary windings between node in1 and node ph1 and between node in2 and node ph2; ii) a second group of windings (any suitable number of windings) includes secondary winding 162-1 and secondary winding 162-2 such as between node PH1 and node PH2.

Based on this assumption, and if an ideal multi-tapped autotransformer is considered and considering that the Magneto Motive Force (MMF) is established by Is1 (a.k.a., Iph1) and Is2 (a.k.a., Iph2) at the secondary side, it must be countered by an MMF in the primary side established by Iin1 and Iin2. In this scenario the following equations are always valid:

$$N1*Iin1 + N1*Iin2 = N2*iph1 + N2*iph2$$

Figure 10:
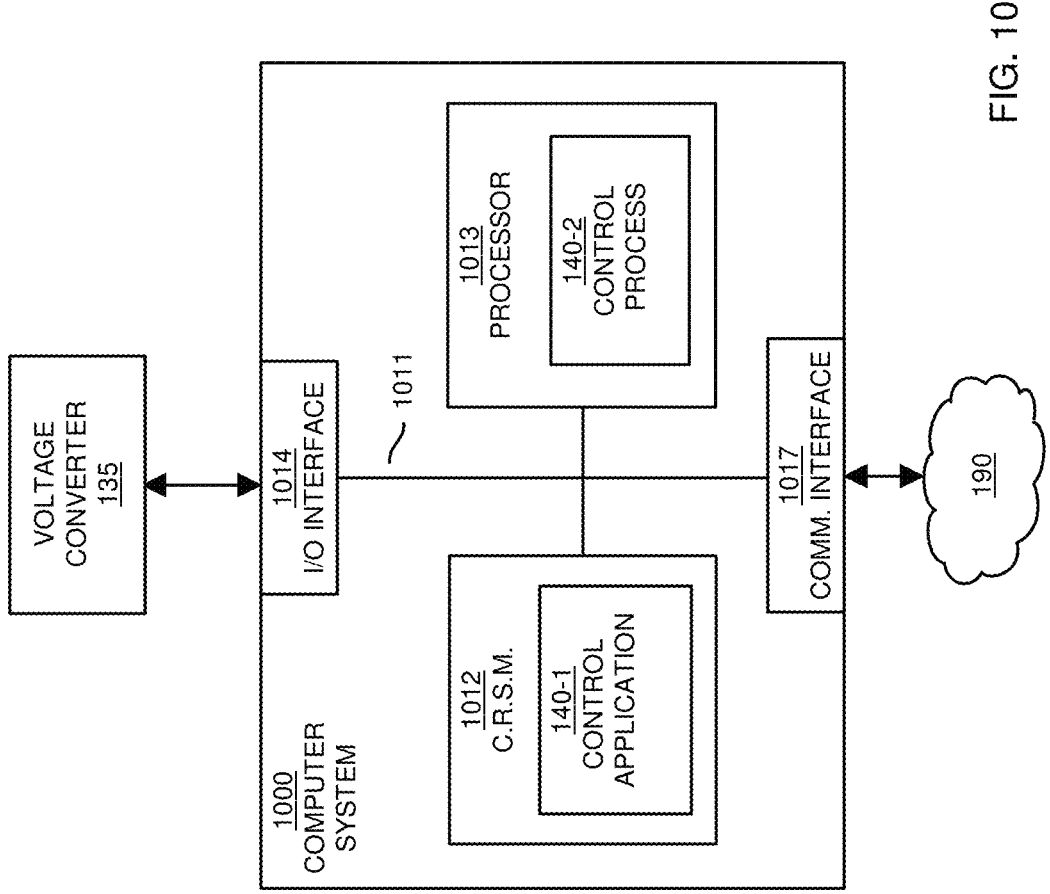
FIG. 10 is an example diagram illustrating computer architecture operable to execute one or more operations according to embodiments herein.

FIG. 10 is an example block diagram of a computer system for implementing any of the operations as previously discussed according to embodiments herein.

Any of the resources (such as controller 140, voltage converter 135, switched-capacitor converter 131, etc.) as discussed herein can be configured to include computer processor hardware and/or corresponding executable instructions to carry out the different operations as discussed herein.

As shown, computer system 1050 of the present example includes an interconnect 1011 that provides coupling of computer readable storage media 1012 such as a non-transitory type of media (which can be any suitable type of hardware storage medium in which digital information can be stored and retrieved), a processor 1013 (computer processor hardware), I/O interface 1014, and a communications interface 1017.

I/O interface(s) 1014 supports connectivity to repository 1080 and input resource 1092.

Computer readable storage medium 1012 can be any hardware storage device such as memory, optical storage, hard drive, floppy disk, etc. In one embodiment, the computer readable storage medium 1012 stores instructions and/or data.

As shown, computer readable storage media 1012 can be encoded with controller application 110-1 (e.g., including instructions) to carry out any of the operations as discussed herein.

During operation of one embodiment, processor 1013 accesses computer readable storage media 1012 via the use of interconnect 1011 in order to launch, run, execute, interpret or otherwise perform the instructions in controller application 110-1 stored on computer readable storage medium 1012. Execution of the controller application 110-1 produces controller process 110-2 to carry out any of the operations and/or processes as discussed herein.

Those skilled in the art will understand that the computer system 1050 can include other processes and/or software and hardware components, such as an operating system that controls allocation and use of hardware resources to execute controller application 110-1.

In accordance with different embodiments, note that computer system may reside in any of various types of devices, including, but not limited to, a power supply, switched-capacitor converter, power converter, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1050 may reside at any location or can be included in any suitable resource in any network environment to implement functionality as discussed herein.

Functionality supported by the different resources will now be discussed via flowchart in FIG. 11. Note that the steps in the flowcharts below can be executed in any suitable order.

Figure 11:
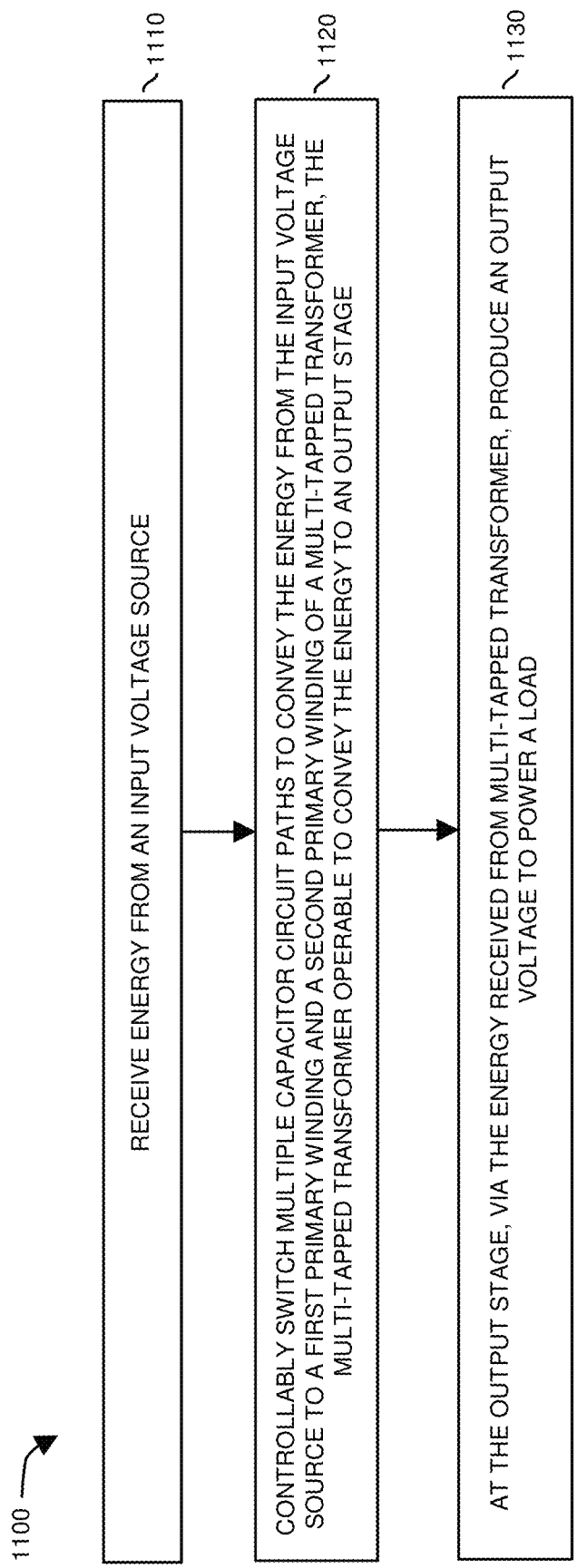
FIG. 11 is an example diagram illustrating a general method according to embodiments herein.

FIG. 11 is a flowchart 1100 illustrating an example method according to embodiments herein. Note that there will be some overlap with respect to concepts as discussed above.

In processing operation 1110, the voltage converter 135 receives energy from an input voltage source, Vin.

In processing operation 1120, the controller 140 controllably switches multiple capacitor circuit paths to convey the energy from the input voltage source, Vin, to a first primary winding 161-1 and a second primary winding 161-2 of the multi-tapped autotransformer 160. As previously discussed, the multi-tapped autotransformer 160 conveys the energy to a secondary winding of the multi-tapped autotransformer in the secondary stage 102 (output stage) of the voltage converter 135.

In processing operation 1130, via the energy received from the multi-tapped autotransformer 160, the secondary stage 102 of the voltage converter produces an output voltage 123 to power the load 118.

Second Embodiments

Further embodiments herein include an apparatus (s a circuit component) associated with a power supply. The apparatus comprises: first windings, second windings, a magnetic core, and multiple tap nodes. The first windings are primary windings of a multi-tapped autotransformer. The second windings are secondary windings of the multi-tapped autotransformer. The first windings and the second windings are wrapped around the magnetic core; the second windings are disposed in a series connection between the first windings. The multiple tap nodes provide coupling of the first windings and/or the second windings to a power supply circuit such as a switched-capacitor converter or other suitable power converter circuit.

Figure 12:
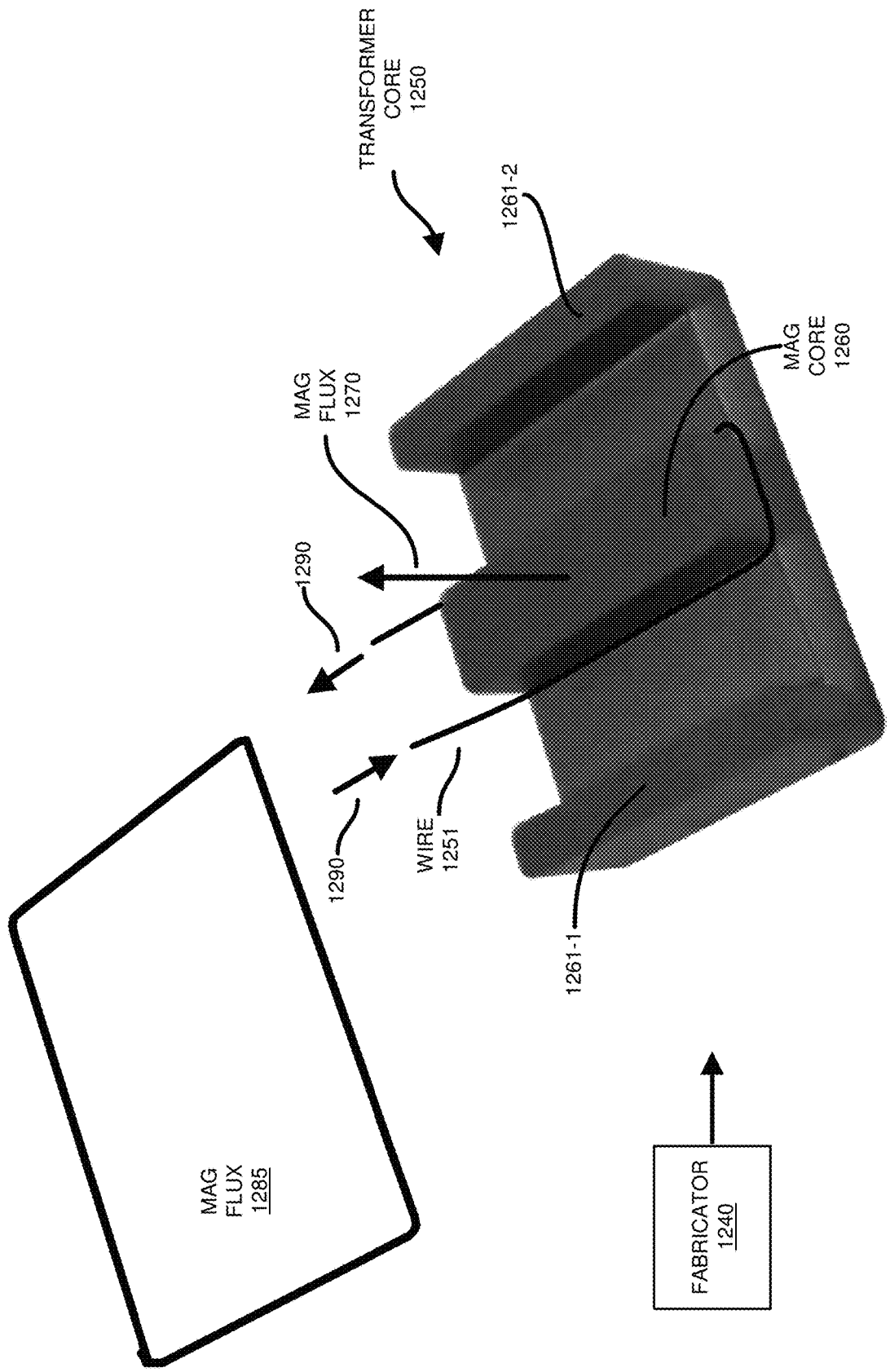
FIG. 12 is an example diagram illustrating details of a body of a multi-tapped autotransformer according to embodiments herein.

Now, more specifically, FIG. 12 is an example 3-D diagram illustrating a multi-tapped autotransformer according to embodiments herein.

In this example embodiment, fabricator 1240 receives the multi-tapped autotransformer core 1250 and winds one or more insulation coated wires (such as including wire 1251) around magnetic core 1260. As described herein, the number of windings around the magnetic core 1260 varies depending on the embodiment.

In one embodiment, the multi-tapped autotransformer core 1250 is an E22 style multi-tapped autotransformer device. In such an instance, the fabricator 1240 wraps the wire 1251 around the magnetic core 1260 associated with the E22 style transistor device. As previously discussed, the E22 style transistor is shown by way of a non-limiting example embodiment. The multi-tapped autotransformer core 1250 can be any suitable shape or size.

As further discussed herein, the fabricator 1240 wraps any number of one or more windings around the core 1260 to produce (fabricate) a multi-tapped autotransformer according to embodiments herein.

In accordance with the right-hand rule, note that flow of current 1290 through the wire 1251 results in generation of the magnetic flux 1270. In one embodiment, the multi-tapped autotransformer core 1250 includes a respective top element 1285 (such as any suitable shape or size to close or return the magnetic flux) that couples to a topside of the multi-tapped autotransformer core 1250 and steers the magnetic flux 1270 through one or both of the magnetic core returns 1261-1 and 1261-2.

FIG. 13 is an example diagram illustrating a table specifying different numbers of turns of respective coils in which to fabricate a multi-tapped autotransformer according to embodiments herein.

As previously discussed, the multi-tapped autotransformer 160 as described herein can be a multi-tapped autotransformer including a corresponding integrated L_zvs inductance (such as implemented via gaps in the core or using a respective core with lower permeability).

Note that magnetizing inductance and the leakage of the multi-tapped autotransformer 160 as described herein can be independently controlled during the design or/and manufacture of the multi-tapped autotransformer. By controlling the equivalent cross section area (and controlling the gap which can be made using the internal leg, the external legs or all legs) of the respective core A_e (associated with magnetic core 1260) for such applications which require a given N1 turns and N2 turns, it is possible to modulate the magnetizing inductance of the multi-tapped autotransformer which is providing the ZVS capability for the power supply 100 (proposed ZVS Tapped Hybrid converter).

Consider case A (such as see FIG. 5): high RMS current path 566 (current through components Q3, winding 162-1, and load 118) is present during operation in phase #1. In such an embodiment, node a is connected to node in1, nodes b and c are shorted internally or externally in the multi-tapped autotransformer 160 to reduce the overall copper losses and are then connected to node 211 (ph1), minimizing a resistance of the high current path 566 shown in FIG. 5. Nodes d and e (com) are shorted together internally or externally. Nodes f and g are shorted internally or externally and are then connected to node 212 (ph2), minimizing resistance of the high current path 766 shown in FIG. 7. Node h is connected to node in2.

Consider case B (such as in FIG. 7): high RMS current path 766 (current through components Q6, winding 162-2, and load 118) is present during operation in phase #3. Node h is connected to node in2, nodes b and c are shorted internally or externally in the multi-tapped autotransformer 160 to reduce the overall copper losses and are then connected to node ph2, minimizing a resistance of the high current path 766 shown in FIG. 7. As previously discussed, nodes d and e are shorted together internally or externally both connected to node com. Nodes f and g are shorted internally or externally and are connected to node ph1, minimizing resistance of the high current path 566 in FIG. 5. Node a is connected to node in1.

As already mentioned, and with further encoding format to FIG. 13, the proposed converter 135 as described herein can be designed for different conversion ratios, such as by changing the ratio between number of windings N1 and N2. In this scenario, based on the number of turns, it is possible to distinguish between "an entire turn" (such as integer number of 1, 2, 3, . . . turns) and "not entire turn" (i.e., non-integer turns such as 0.5, 1.5, 2.5, . . . turns). Based on the different possible combination of turns for each coil (winding), as shown in the table 1305 of FIG. 13, there are 4 different possible cases for the turns arrangement for N1 and N2.

Note further that, in one embodiment, the proposed ZVS Tapped Hybrid switched-capacitor converter 131 (such as in power supply 100 of FIG. 1) is configured to produce an unregulated voltage, which may be based on an input voltage 120 (Vin) such as 48 VDC from a data-center power system architecture. In such an instance, it is desired to reduce $I^2 R$ losses, especially for the resonant power converter as described herein.

Embodiments herein include reducing overall winding losses by selecting the optimal windings and a magnetic core structure based on the module size (such as based on a standard brick, quarter brick, etc.). By considering the equivalent core area required Ae (associated with magnetic core 1260, area determined via a top view through the core), and the maximum AC resistance Rac for a given switching frequency, any suitable core shape can be selected to create the respective multi-tapped autotransformer 160, but the position of the load and the source (with respect to body of the multi-tapped autotransformer 160) have to be considered to provide low losses. For example, in certain instances, it is desirable that the output nodes d and e (which may be the same node) associated with the transistor 160 be located disposed near (or nearest) the respective load 118.

Figure 14:
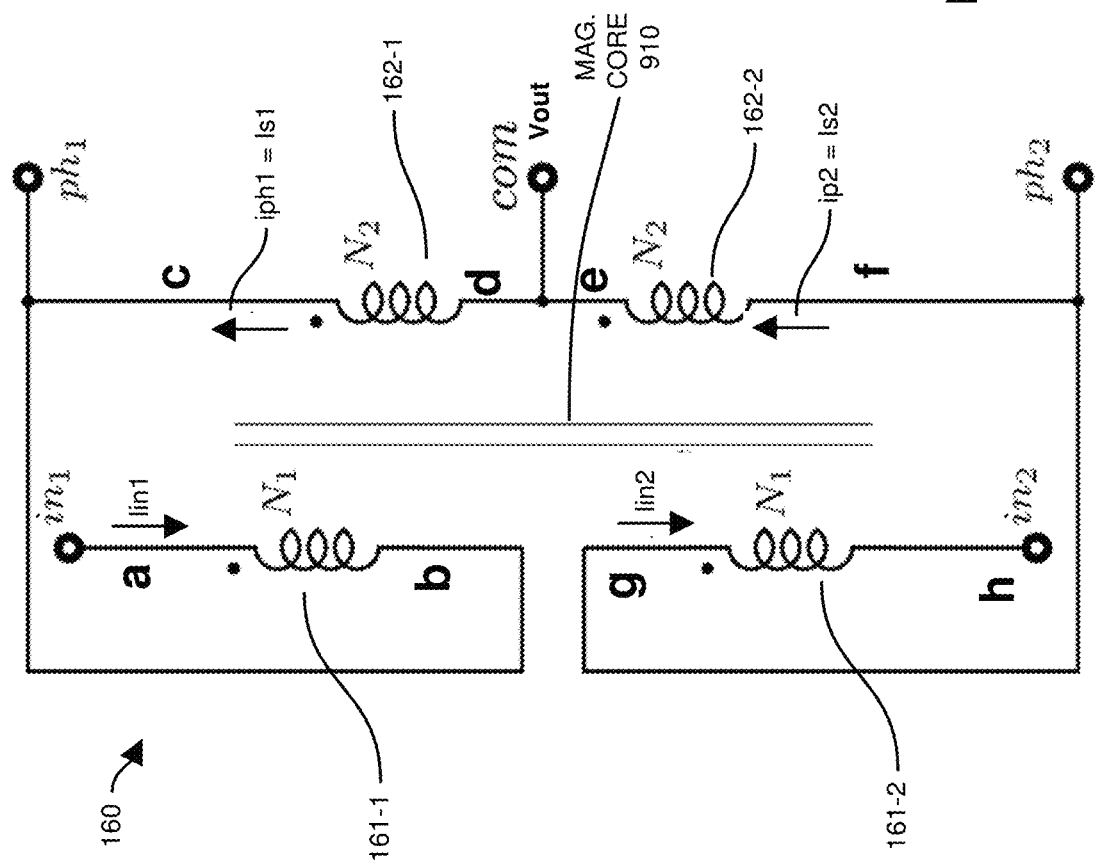
FIG. 14 is an example diagram illustrating a logical circuit representation of a multi-tapped autotransformer according to embodiments herein.

Based on the cases highlighted in table 1305 of FIG. 13, embodiments herein include 2 types of possible "power flows" (so-called horizontal or vertical) for the multi-tapped autotransformer 160 (such as having 4 windings—two primary windings and 2 secondary windings) for the ZVS Tapped Hybrid SCC. Different examples of the power flows associated with multi-tapped autotransformer 160 in FIG. 14 are further discussed in FIGS. 15A, 15B, 16A, 16B, 17A, 17B, 18A, and 18B. As previously discussed, the multi-tapped autotransformer core 1250 and/or the magnetic core 1260 can be configured as any suitable type of magnetic structure in accordance with different possible implementation topologies.

FIG. 14 is an example diagram illustrating a logical configuration of a multi-tapped autotransformer according to embodiments herein.

As previously discussed, in one embodiment, the multi-tapped autotransformer 160 includes primary windings 161-1 and 161-2 as well as secondary windings 162-1 and 162-2. In accordance with further embodiments, note that the current on 161-1 and 161-2, in respect to current direction reported in FIG. 14, are generating a flux on magnetic core 910 in the opposite direction comparing with the flux generated by 162-1 and 162-2 on magnetic core 910.

In this example embodiment, primary winding 161-1 is connected between node a and node b; node b is connected to node c; secondary winding 162-1 is connected between node c and node d; node d is connected to node e (forming common node); secondary winding 162-2 is connected between node e and node f; node f is connected to node g; primary winding 161-2 is connected between node g and node h.

Following FIGS. 15A, 15B, 16A, 16B, 17A, 17B, 18A, and 18B illustrate implementation of the multi-tapped autotransformer 160 in FIG. 14.

Figure 15B:
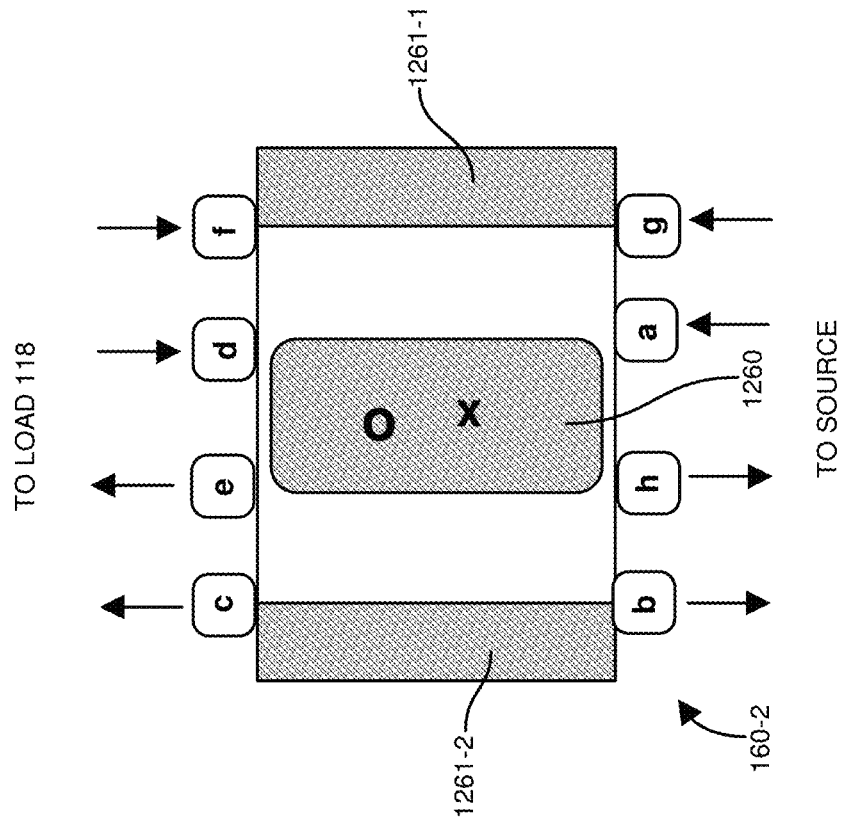
FIGS. 15A and 15B are example diagrams illustrating different top views of a multi-tapped autotransformer according to embodiments herein.
Figure 15A:
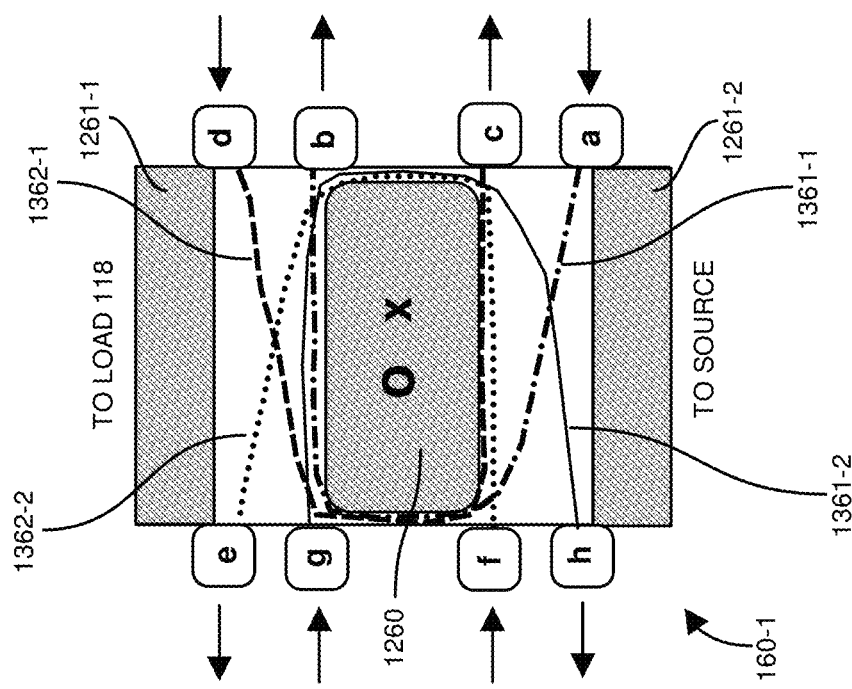

FIG. 15A is an example top view of a multi-tapped autotransformer core and corresponding windings according to embodiments herein.

In this example embodiment, the fabricator 1240 provides one or more windings around the magnetic core 1260 based on the windings as shown in FIG. 14.

As shown in this example embodiment, nodes e, g, f, and h are disposed on a left side of multi-tapped autotransformer 160-1; nodes d, b, c, and a are disposed on a right side of multi-tapped autotransformer 160-1. Load 118 is disposed nearest nodes d and e; a power source such as Vin is disposed nearest nodes h and a.

In one embodiment, the multi-tapped autotransformer 160-1 (such as a first example instance of multi-tapped autotransformer 160 based on use of a multi-tapped autotransformer core 1250) provides connectivity (low impedance path or short circuit) between nodes b and c, nodes d and e, and nodes f and g. Alternatively, a circuit board (fabricating the power supply 100 as in FIG. 1) to which the multi-tapped autotransformer 160-1 is attached provides short circuit connectivity between nodes b and c, nodes d and e, and nodes f and g, resulting in connectivity as shown in FIG. 14.

Further in this example embodiment of FIG. 15A, the primary winding 161-1 of the multi-tapped autotransformer 160-1 (vertical flow implementation) includes a one or more windings (N1 turns) around magnetic core 1260 extending between node a (such as a pin, surface mount pad, etc.) of the multi-tapped autotransformer 160-1 and corresponding node b (such as a pin, surface mount pad, etc.). As further shown, current flowing into node a passes through winding 1361-1 (N1 turns of wire 1361-1 associated with primary winding 161-1) and out of node b.

The example multi-tapped autotransformer 160-1 further includes one or more windings (N2 turns of wire 1362-1) around magnetic core 1260 extending between node c (such as a pin, surface mount pad, etc.) of the multi-tapped autotransformer 160-1 and corresponding node d (such as a pin, surface mount pad, etc.). As further shown, current flowing into node d passes through winding 1362-1 (N2 turns or secondary winding 162-1) and out of node c.

The example multi-tapped autotransformer 160-1 further includes one or more windings (N2 turns of wire 1361-2) around magnetic core 1260 extending between node e (such as a pin, surface mount pad, etc.) of the multi-tapped autotransformer 160-1 and corresponding node f (such as a pin, surface mount pad, etc.). As further shown, current flowing into node f passes through wire 1362-2 (N2 turns or secondary winding 162-2) and out of node e.

The multi-tapped autotransformer 160-1 includes one or more windings (N1 turns of wire 1361-2) around magnetic core 1260 extending between node g (such as a pin, surface mount pad, etc.) of the multi-tapped autotransformer 160-1 and corresponding node h (such as a pin, surface mount pad, etc.). As further shown, current flowing into node g passes through a respective wire 1361-2 (N1 turns or primary winding 161-2) and out of node h.

Note that a direction of the flux X and flux O that pass through the magnetic core 1260 of the multi-tapped autotransformer 160-1 depends on a direction of corresponding current flow. For example, current flowing in a clockwise direction around the magnetic core 1260, based on the right hand rule, produces magnetic flux X (orthogonal) into the paper. Conversely, current flowing in a counter clockwise direction around the magnetic core 1260, based on the right hand rule, produces magnetic flux O (orthogonal) out of the paper.

FIG. 15B is an example diagram illustrating a top view of a multi-tapped autotransformer according to embodiments herein.

In this example embodiment, the fabricator 1240 provides one or more windings around the magnetic core 1260 based on the windings as shown in FIG. 14. As shown, nodes c, e, d, and f are disposed along a top edge of the multi-tapped autotransformer 160-2 (second instantiation of multi-tapped autotransformer 160) nearest the load 118; nodes b, h, a, and g are disposed along a bottom edge of the multi-tapped autotransformer 160-2 nearest a power source supplying energy to produce the output voltage outputted from nodes d and e.

In one embodiment, in a manner as previously discussed, the multi-tapped autotransformer 160-2 provides connectivity (low impedance path or short circuit) between nodes b and c, nodes d and e, and nodes f and g. Alternatively, a circuit board to which the multi-tapped autotransformer 160-2 is attached provides short circuit connectivity between nodes b and c, nodes d and e, and nodes f and g, resulting in node and winding connectivity as shown in FIG. 14.

Further in this example embodiment, the multi-tapped autotransformer 160-2 (horizontal flow implementation) includes one or more windings (N1 turns of respective wire) around magnetic core 1260 extending between node a (such as a pin, surface mount pad, etc.) of the multi-tapped autotransformer 160-2 and corresponding node b (such as a pin, surface mount pad, etc.). As further shown, current flowing into node a passes through a respective winding (wire such as N1 turns associated with primary winding 161-1) and out of node b.

The example multi-tapped autotransformer 160-2 further includes one or more windings (N2 turns) around magnetic core 1260 extending between node c (such as a pin, surface mount pad, etc.) of the multi-tapped autotransformer 160-2 and corresponding node d (such as a pin, surface mount pad, etc.). As further shown, current flowing into node d passes through a respective winding (N2 turns associated with secondary winding 162-1) and out of node c.

The example multi-tapped autotransformer 160-2 further includes one or more windings (N2 turns of wire) around magnetic core 1260 extending between node e (such as a pin, surface mount pad, etc.) of the multi-tapped autotransformer 160-2 and corresponding node f (such as a pin, surface mount pad, etc.). As further shown, current flowing into node f passes through a respective winding (N2 turns of wire associated with secondary winding 162-2) and out of node e.

The multi-tapped autotransformer 160-2 includes one or more windings (N1 turns) around magnetic core 1260 extending between node g (such as a pin, surface mount pad, etc.) of the multi-tapped autotransformer 160-2 and corresponding node h (such as a pin, surface mount pad, etc.). As further shown, current flowing into node g passes through a respective winding (N1 turns of wire associated with primary winding 161-2) and out of node h.

Note again that a direction of the flux X and flux O that pass through the magnetic core 1260 of the multi-tapped autotransformer 160-2 depends on a direction of corresponding current flow. For example, as previously discussed current flowing in a clockwise direction around the magnetic core 1260, based on the right hand rule, produces magnetic flux X (orthogonal) into the paper. Conversely, current flowing in a counter clockwise direction around the magnetic core 1260, based on the right hand rule, produces magnetic flux O (orthogonal) out of the paper.

FIG. 16A is an example diagram illustrating a top view of a multi-tapped autotransformer according to embodiments herein.

In this example embodiment, the fabricator 1240 provides multiple windings around the magnetic core 1260 based on the windings as shown in FIG. 14. As shown in FIG. 16A, nodes d, f, g, and a are disposed on a left side of multi-tapped autotransformer 160-3; nodes e, c, b, and h are disposed on a right side of multi-tapped autotransformer 160-3. Load 118 is disposed nearest nodes d and e; the source such as Vin is disposed nearest nodes h and a.

In one embodiment, the multi-tapped autotransformer 160-3 provides connectivity (low impedance path or short circuit) between nodes b and c, nodes d and e, and nodes f and g. Alternatively, a circuit board to which the multi-tapped autotransformer 160-3 is attached provides short circuit connectivity between nodes b and c, nodes d and e, and nodes f and g, resulting in connectivity as shown in FIG. 14.

Further in this example embodiment, the multi-tapped autotransformer 160-3 (vertical flow implementation) includes half or more windings (N1 turns) around magnetic core 1260 extending between node a (such as a pin, surface mount pad, etc.) of the multi-tapped autotransformer 160-3 and corresponding node b (such as a pin, surface mount pad, etc.). As further shown, current flowing into node a passes through a respective winding (wire such as N1 turns associated with primary winding 161-1) and out of node b.

The example multi-tapped autotransformer 160-3 further includes half or more windings (N2 turns) around magnetic core 1260 extending between node c (such as a pin, surface mount pad, etc.) of the multi-tapped autotransformer 160-3 and corresponding node d (such as a pin, surface mount pad, etc.). As further shown, current flowing into node d passes through a respective winding (such as N2 turns associated with secondary winding 162-1) and out of node c.

The example multi-tapped autotransformer 160-3 further includes half or more windings (N2 turns of respective wire) around magnetic core 1260 extending between node e (such as a pin, surface mount pad, etc.) of the multi-tapped autotransformer 160-3 and corresponding node f (such as a pin, surface mount pad, etc.). As further shown, current flowing into node f passes through a respective winding (N2 turns of wire associated with secondary winding 162-2) and out of node e.

The multi-tapped autotransformer 160-3 further includes a half or more windings (N1 turns) around magnetic core 1260 extending between node g (such as a pin, surface mount pad, etc.) of the multi-tapped autotransformer 160-3 and corresponding node h (such as a pin, surface mount pad, etc.). As further shown, current flowing into node g passes through a respective winding (N1 turns associated with primary winding 161-2) and out of node h.

FIG. 16B is an example diagram illustrating a top view of a multi-tapped autotransformer according to embodiments herein.

In this example embodiment, the fabricator 1240 provides multiple windings around the magnetic core 1260 based on the windings as shown in FIG. 14. As shown, nodes g, e, d, and b are disposed along an edge of the multi-tapped autotransformer 160-4 nearest the load 118; nodes f, h, a, and c are disposed along a bottom edge of the multi-tapped autotransformer 160-4 nearest a power source supplying energy to produce the output voltage outputted from nodes d and e.

In one embodiment, in a manner as previously discussed, the multi-tapped autotransformer 160-4 provides connectivity (low impedance path or short circuit) between nodes b and c, nodes d and e, and nodes f and g. Alternatively, a circuit board to which the multi-tapped autotransformer 160-4 is attached provides short circuit connectivity between nodes b and c, nodes d and e, and nodes f and g, resulting in connectivity as shown in FIG. 14.

Further in this example embodiment, the multi-tapped autotransformer 160-4 (horizontal flow implementation) includes a half or more windings (N1 turns or respective wire) around magnetic core 1260 extending between node a (such as a pin, surface mount pad, etc.) of the multi-tapped autotransformer 160-4 and corresponding node b (such as a pin, surface mount pad, etc.). As further shown, current flowing into node a passes through a respective winding (wire such as N1 turns associated with primary winding 161-1) and out of node b.

The example multi-tapped autotransformer 160-4 further includes a half or more windings (N2 turns of wire) around magnetic core 1260 extending between node c (such as a pin, surface mount pad, etc.) of the multi-tapped autotransformer 160-4 and corresponding node d (such as a pin, surface mount pad, etc.). As further shown, current flowing into node d passes through a respective winding (such as N2 turns associated with secondary winding 162-1) and out of node c.

The example multi-tapped autotransformer 160-4 further includes a half or more windings (N2 turns) around magnetic core 1260 extending between node e (such as a pin, surface mount pad, etc.) of the multi-tapped autotransformer 160-4 and corresponding node f (such as a pin, surface mount pad, etc.). As further shown, current flowing into node f passes through a respective winding (such as N2 turns of wire associated with secondary winding 162-2) and out of node e.

The multi-tapped autotransformer 160-4 includes a half or more windings (N1 turns) around magnetic core 1260 extending between node g (such as a pin, surface mount pad, etc.) of the multi-tapped autotransformer 160-4 and corresponding node h (such as a pin, surface mount pad, etc.). As further shown, current flowing into node g passes through a respective winding (N1 turns associated with primary winding 161-2) and out of node h.

Figure 17B:
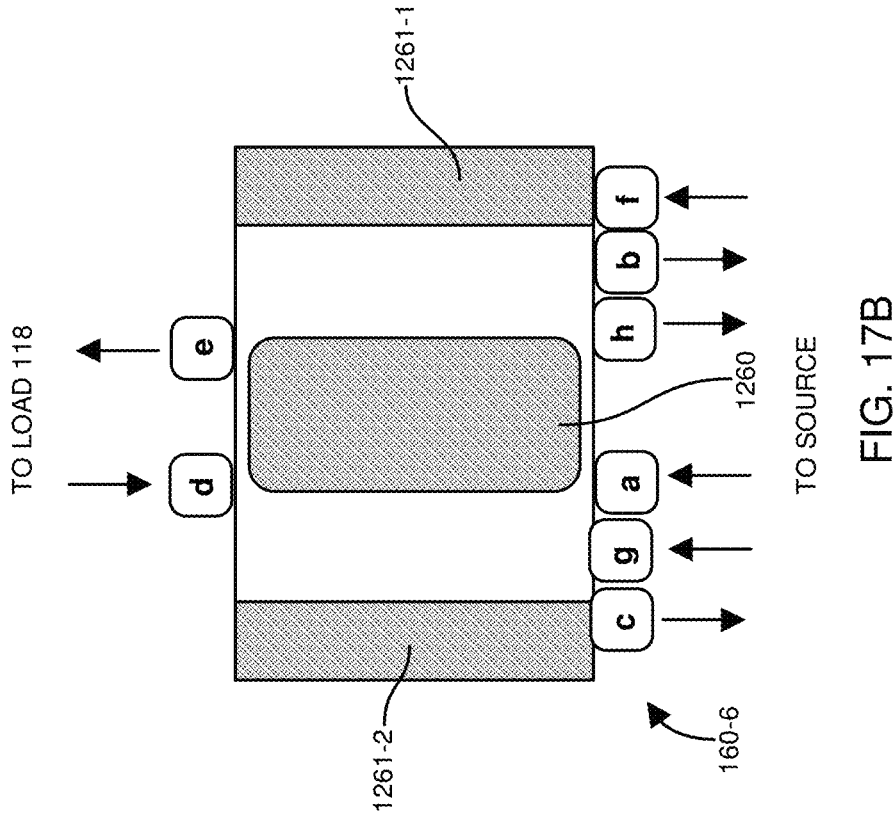
FIGS. 17A and 17B are example diagrams illustrating different top views of a multi-tapped autotransformer according to embodiments herein.
Figure 17A:
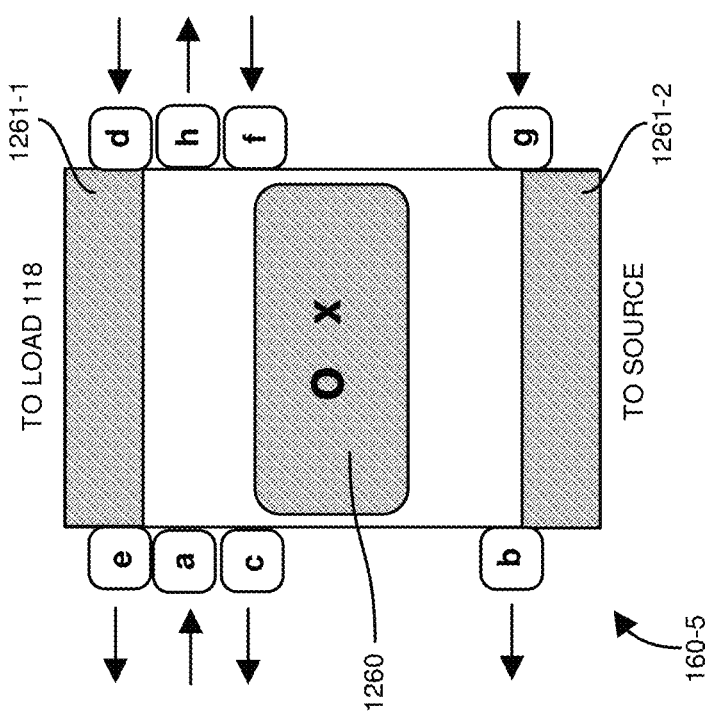

FIG. 17A is an example diagram illustrating a top view of a multi-tapped autotransformer according to embodiments herein.

In this example embodiment, the fabricator 1240 provides multiple windings around the magnetic core 1260 based on the windings as shown in FIG. 14. As shown, nodes e, a, c, and b are disposed on a left side of multi-tapped autotransformer 160-5; nodes d, h, f, and g are disposed on a right side of multi-tapped autotransformer 160-5. Load 118 is disposed nearest nodes d and e; the source such as Vin is disposed nearest nodes b and g.

In one embodiment, the multi-tapped autotransformer 160-5 provides connectivity (low impedance path or short circuit) between nodes b and c, nodes d and e, and nodes f and g. Alternatively, a circuit board to which the multi-tapped autotransformer 160-5 is attached provides short circuit connectivity between nodes b and c, nodes d and e, and nodes f and g, resulting in connectivity of nodes as shown in FIG. 14.

For example, the multi-tapped autotransformer 160-5 (vertical flow implementation) includes one or more windings (N1 turns) around magnetic core 1260 extending between node a (such as a pin, surface mount pad, etc.) of the multi-tapped autotransformer 160-5 and corresponding node b (such as a pin, surface mount pad, etc.). As further shown, current flowing into node a passes through a respective winding (wire such as N1 turns associated with primary winding 161-1) and out of node b.

The example multi-tapped autotransformer 160-5 further includes half or more windings (N2 turns) around magnetic core 1260 extending between node c (such as a pin, surface mount pad, etc.) of the multi-tapped autotransformer 160-5 and corresponding node d (such as a pin, surface mount pad, etc.). As further shown, current flowing into node d passes through a respective winding (such as N2 turns associated with secondary winding 162-1) and out of node c.

The example multi-tapped autotransformer 160-5 further includes a half or more windings (N2 turns) around magnetic core 1260 extending between node e (such as a pin, surface mount pad, etc.) of the multi-tapped autotransformer 160-5 and corresponding node f (such as a pin, surface mount pad, etc.). As further shown, current flowing into node f passes through a respective winding (such as N2 turns of wire associated with secondary winding 162-2) and out of node e.

The multi-tapped autotransformer 160-5 includes one or more windings (N1 turns) around magnetic core 1260 extending between node g (such as a pin, surface mount pad, etc.) of the multi-tapped autotransformer 160-5 and corresponding node h (such as a pin, surface mount pad, etc.). As further shown, current flowing into node g passes through a respective winding (N1 turns associated with primary winding 161-2) and out of node h.

FIG. 17B is an example diagram illustrating a top view of a multi-tapped autotransformer according to embodiments herein.

In this example embodiment, the fabricator 1240 provides multiple windings around the magnetic core 1260 based on the windings as shown in FIG. 14. As shown, nodes d and e are disposed along a top edge of the multi-tapped autotransformer 160-6 nearest the load 118; nodes c, g, a, h, b, and f are disposed along a bottom edge of the multi-tapped autotransformer 160-6 nearest a power source supplying energy to produce the output voltage outputted from nodes d and e.

In one embodiment, in a manner as previously discussed, the multi-tapped autotransformer 160-6 provides connectivity (low impedance path or short circuit) between nodes b and c, nodes d and e, and nodes f and g. Alternatively, a circuit board to which the multi-tapped autotransformer 160-2 is attached provides short circuit connectivity between nodes b and c, nodes d and e, and nodes f and g, resulting in connectivity as shown in FIG. 14.

The multi-tapped autotransformer 160-6 (horizontal flow implementation) includes one or more windings (N1 turns) around magnetic core 1260 extending between node a (such as a pin, surface mount pad, etc.) of the multi-tapped autotransformer 160-6 and corresponding node b (such as a pin, surface mount pad, etc.). As further shown, current flowing into node a passes through a respective winding (wire such as N1 turns associated with primary winding 161-1) and out of node b.

The example multi-tapped autotransformer 160-6 further includes a half or more windings (N2 turns of wire) around magnetic core 1260 extending between node c (such as a pin, surface mount pad, etc.) of the multi-tapped autotransformer 160-6 and corresponding node d (such as a pin, surface mount pad, etc.). As further shown, current flowing into node d passes through a respective winding (N2 turns associated with secondary winding 162-1) and out of node c.

The example multi-tapped autotransformer 160-6 further includes a half or more windings (N2 turns) around magnetic core 1260 extending between node e (such as a pin, surface mount pad, etc.) of the multi-tapped autotransformer 160-6 and corresponding node f (such as a pin, surface mount pad, etc.). As further shown, current flowing into node f passes through a respective winding (N2 turns of wire associated with secondary winding 162-2) and out of node e.

The multi-tapped autotransformer 160-6 includes one or more windings (N1 turns) around magnetic core 1260 extending between node g (such as a pin, surface mount pad, etc.) of the multi-tapped autotransformer 160-6 and corresponding node h (such as a pin, surface mount pad, etc.). As further shown, current flowing into node g passes through a respective winding (N1 turns associated with primary winding 161-2) and out of node h.

FIG. 18A is an example diagram illustrating a top view of a multi-tapped autotransformer according to embodiments herein. As shown, nodes e, f, g, and a are disposed on a left side of multi-tapped autotransformer 160-7; nodes d, c, b, and h are disposed on a right side of multi-tapped autotransformer 160-7. Load 118 is disposed nearest nodes d and e; the source such as Vin is disposed nearest nodes h and a.

In one embodiment, the multi-tapped autotransformer 160-7 provides connectivity (low impedance path or short circuit) between nodes b and c, nodes d and e, and nodes f and g. Alternatively, a circuit board to which the multi-tapped autotransformer 160-7 is attached provides short circuit connectivity between nodes b and c, nodes d and e, and nodes f and g, resulting in connectivity as shown in FIG. 14.

In this example embodiment, the fabricator 1240 provides multiple windings around the magnetic core 1260 based on the windings as shown in FIG. 14.

For example, the multi-tapped autotransformer 160-7 (vertical flow implementation) includes a half or more windings (N1 turns) around magnetic core 1260 extending between node a (such as a pin, surface mount pad, etc.) of the multi-tapped autotransformer 160-7 and corresponding node b (such as a pin, surface mount pad, etc.). As further shown, current flowing into node a passes through a respective winding (wire such as N1 turns associated with primary winding 161-1) and out of node b.

The example multi-tapped autotransformer 160-7 further includes a one or more windings (N2 turns) around magnetic core 1260 extending between node c (such as a pin, surface mount pad, etc.) of the multi-tapped autotransformer 160-7 and corresponding node d (such as a pin, surface mount pad, etc.). As further shown, current flowing into node d passes through a respective winding (N2 turns associated with secondary winding 162-1) and out of node c.

The example multi-tapped autotransformer 160-7 further includes a one or more windings (N2 turns) around magnetic core 1260 extending between node e (such as a pin, surface mount pad, etc.) of the multi-tapped autotransformer 160-7 and corresponding node f (such as a pin, surface mount pad, etc.). As further shown, current flowing into node f passes through a respective winding (N2 turns of wire associated with secondary winding 162-2) and out of node e.

The multi-tapped autotransformer 160-7 includes a half or more windings (N1 turns) around magnetic core 1260 extending between node g (such as a pin, surface mount pad, etc.) of the multi-tapped autotransformer 160-7 and corresponding node h (such as a pin, surface mount pad, etc.). As further shown, current flowing into node g passes through a respective winding (N1 turns associated with primary winding 161-2) and out of node h.

FIG. 18B is an example diagram illustrating a top view of a multi-tapped autotransformer according to embodiments herein.

In this example embodiment, the fabricator 1240 provides multiple windings around the magnetic core 1260 based on the windings as shown in FIG. 14. As shown, nodes g, f, e, d, c, and b are disposed along a top edge of the multi-tapped autotransformer 160-8 nearest the load 118; nodes a and h are disposed along a bottom edge of the multi-tapped autotransformer 160-8 nearest a power source supplying energy to produce the output voltage outputted from nodes d and e.

In one embodiment, in a manner as previously discussed, the multi-tapped autotransformer 160-8 provides connectivity (low impedance path or short circuit) between nodes b and c, nodes d and e, and nodes f and g. Alternatively, a circuit board to which the multi-tapped autotransformer 160-8 is attached provides short circuit connectivity between nodes b and c, nodes d and e, and nodes f and g, resulting in connectivity as shown in FIG. 14.

For example, the multi-tapped autotransformer 160-8 (horizontal flow implementation) includes a half or more windings (N1 turns) around magnetic core 1260 extending between node a (such as a pin, surface mount pad, etc.) of the multi-tapped autotransformer 160-8 and corresponding node b (such as a pin, surface mount pad, etc.). As further shown, current flowing into node a passes through a respective winding (wire such as N1 turns associated with primary winding 161-1) and out of node b.

The example multi-tapped autotransformer 160-8 further includes a one or more windings (N2 turns) around magnetic core 1260 extending between node c (such as a pin, surface mount pad, etc.) of the multi-tapped autotransformer 160-8 and corresponding node d (such as a pin, surface mount pad, etc.). As further shown, current flowing into node d passes through a respective winding (N2 turns associated with secondary winding 162-1) and out of node c.

The example multi-tapped autotransformer 160-8 further includes a one or more windings (N2 turns) around magnetic core 1260 extending between node e (such as a pin, surface mount pad, etc.) of the multi-tapped autotransformer 160-8 and corresponding node f (such as a pin, surface mount pad, etc.). As further shown, current flowing into node f passes through a respective winding (N2 turns of wire associated with secondary winding 162-2) and out of node e.

The multi-tapped autotransformer 160-8 includes a half or more windings (N1 turns) around magnetic core 1260 extending between node g (such as a pin, surface mount pad, etc.) of the multi-tapped autotransformer 160-8 and corresponding node h (such as a pin, surface mount pad, etc.). As further shown, current flowing into node g passes through a respective winding (N1 turns associated with primary winding 161-2) and out of node h.

Figure 19:
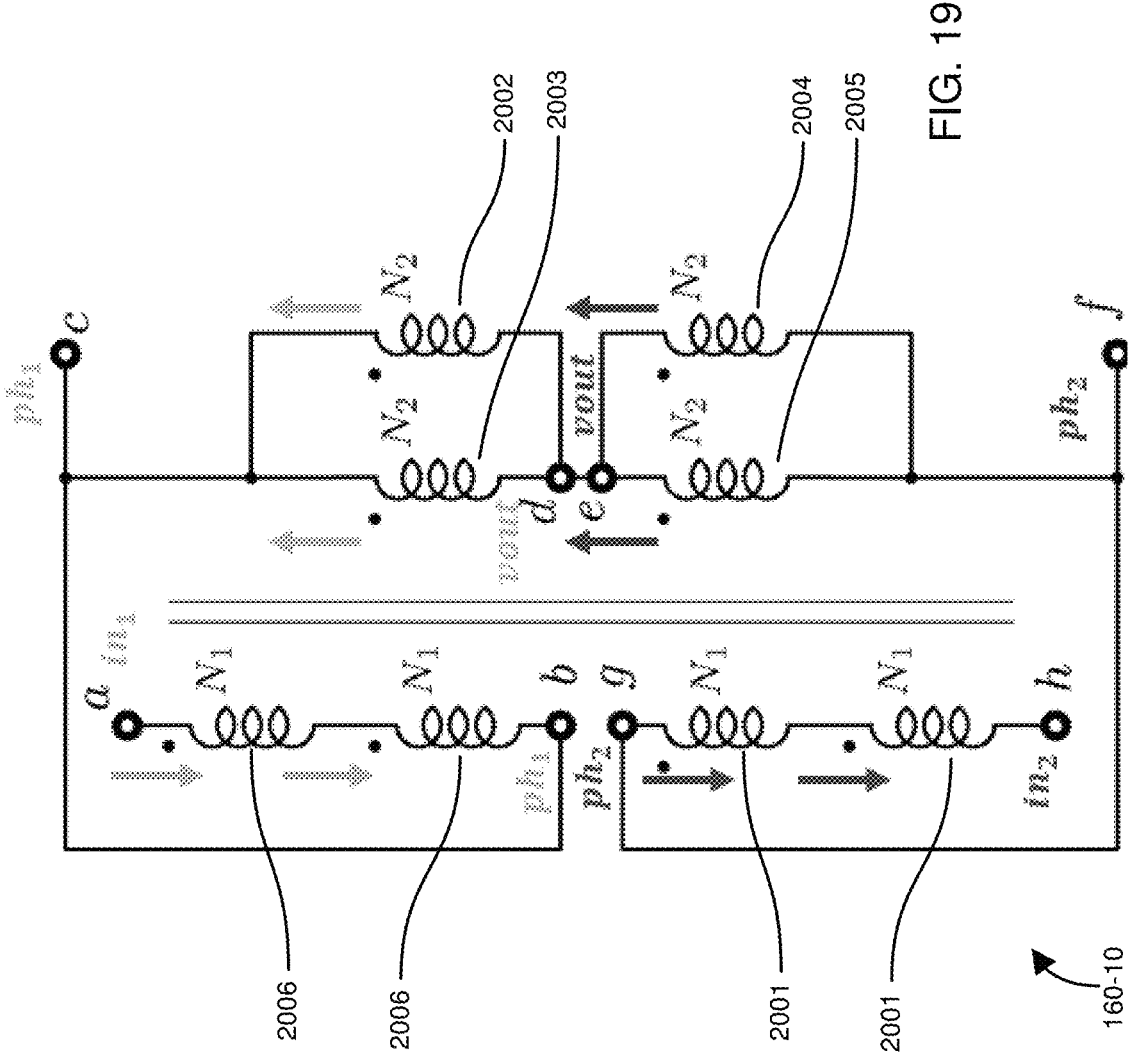
FIG. 19 is an example diagram illustrating of a multi-tapped autotransformer including supplemental primary windings (in series) and supplemental secondary windings (in parallel), with 2 elemental autotransformer integrated in one structure according to embodiments herein.

FIG. 19 is an example diagram illustrating an enhanced version of a multi-tapped autotransformer according to embodiments herein.

To further increase the performance of the proposed converter an alternative MTA (multi-tapped autotransformer) can be designed based on the matrix concept as shown in FIG. 19. The matrix multi-tapped autotransformer (MMTA) depicted in FIG. 19 presents the same equivalent electric circuit depicted in FIG. 14, but allows modification of size to accommodate different design needs.

In this example embodiment of FIG. 19, the multi-tapped autotransformer 160-10 is a matrix multi-tapped autotransformer including two inter-wired elements. Note that the number of inter-wired winding elements can vary depending on the embodiment. For example, the matrix multi-tapped autotransformer 160 can include any number of primary windings connected in series; the matrix multi-tapped autotransformer 160 can include any number of secondary windings connected in parallel.

In this example embodiment of FIG. 19, the instantiation of the matrix multi-tapped autotransformer 160-10 includes: i) multiple (two) primary windings 2001 (N1 turns each) connected in series between nodes a and b, ii) multiple secondary windings 2002 and 2003 (N2 turns each) connected in parallel between nodes c and d, iii) multiple secondary windings 2004 and 2005 (N2 turns each) connected in parallel between nodes e and f, iv) multiple primary winding windings 2001 (N1 turns each) connected in series between nodes g and h.

As previously discussed, the actual ratio between input and output voltage depends on the ratio between windings N1 and N2 and number of windings in serial or parallel. When the matrix multi-tapped autotransformer (such as matrix multi-tapped autotransformer 160-10 in FIG. 19) is implemented in the power supply 100 of FIG. 2, the ratio between input voltage Vin and output voltage Vout is given by the following equation:

$$Vin/Vout = 4 + 2(2N1)/N2$$

Figure 26:
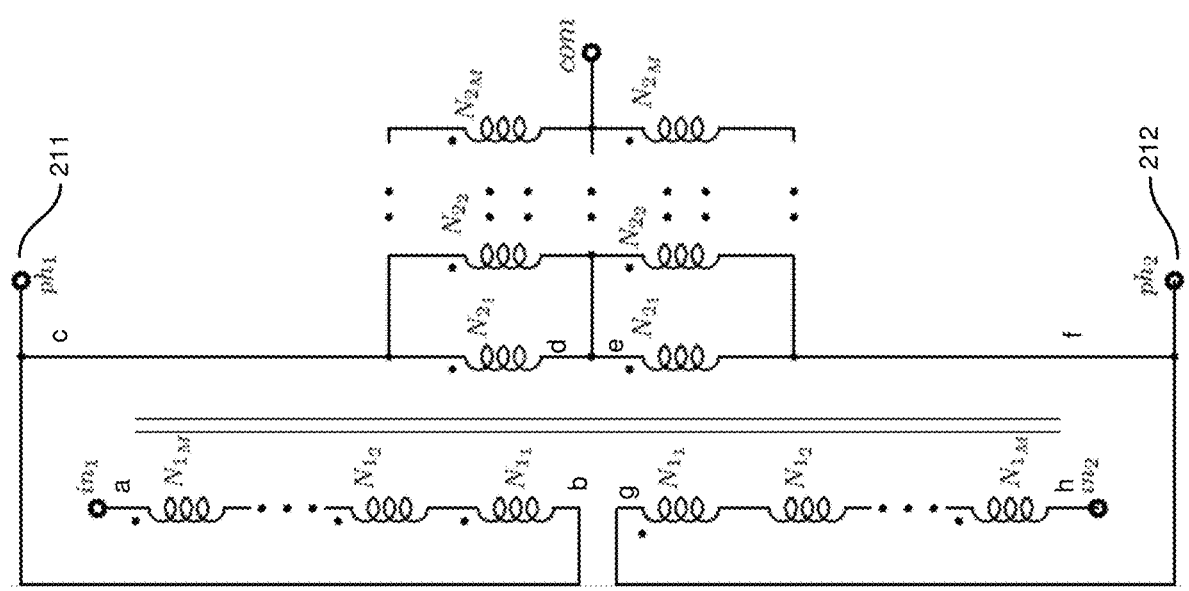
FIG. 26 is an example diagram illustrating details of a matrix multi-tapped autotransformer with M elemental autotransformer according to embodiments herein.

FIG. 26 is an example diagram illustrating details of a matrix multi-tapped autotransformer according to embodiments herein.

To further increase the performance of the proposed converter 135, the matrix multi-tapped autotransformer 160 in power supply 100 can be replaced with the enhanced matrix multi-tapped autotransformer 160-26 as shown in FIG. 26.

As shown in FIG. 26, the number of primary windings and secondary windings in matrix multi-tapped autotransformer 160-11 can vary depending on the embodiment. For example, in the above case of FIG. 19, there are M=2 primary windings and secondary windings.

Note further that the matrix multi-tapped autotransformer 160 as described herein as implemented in power supply 100 can include any number of M (any integer value such as M=2, M=3, M=4, etc.) primary windings (connected in series) and M (any integer value such as M=2, M=3, M=4, etc.) second windings (connected in parallel).

For example, matrix multi-tapped autotransformer 160-26 includes: multiple primary windings (N11, N12, ... N1M; where N1M=N12=N11= ... =N1) coupled in series between node a and node b, multiple secondary windings (N21, N22, ... N2M; where N2M=N21=N22= ... =N2) coupled in parallel between node c and node d, multiple secondary windings (N21, N22, ... N2M) coupled in parallel between node e and node f, multiple primary windings (N11, N12, ... N1M) coupled in series between node g and node h.

In such an instance, the ratio between input voltage Vin and output voltage Vout is given by the following equation:

$$Vin/Vout = 4 + 2(M*N1)/N2$$

where M (such as any integer value 1, 2, 3, 4, 5, 6, etc.) is the number of windings connected in series at the primary side and the number of windings connected in parallel at secondary side.

The benefits of using a matrix multi-tapped autotransformer 160 as described herein, in the proposed topology, is that it can split current between secondary windings connected in parallel reducing the leakage inductance of the secondary loop inductance and reducing the overall windings losses; moreover, if designed properly, this allows for flux cancellation.

In one embodiment, the matrix multi-tapped autotransformer 160 is configured to include X primary windings connected in series between nodes a and b; and X primary windings connected in series between nodes g and h. In the same circuit, the matrix multi-tapped autotransformer 160 can be configured to include X secondary windings connected in parallel between nodes c and d; and X second windings connected in parallel between nodes e and f.

Figure 20:
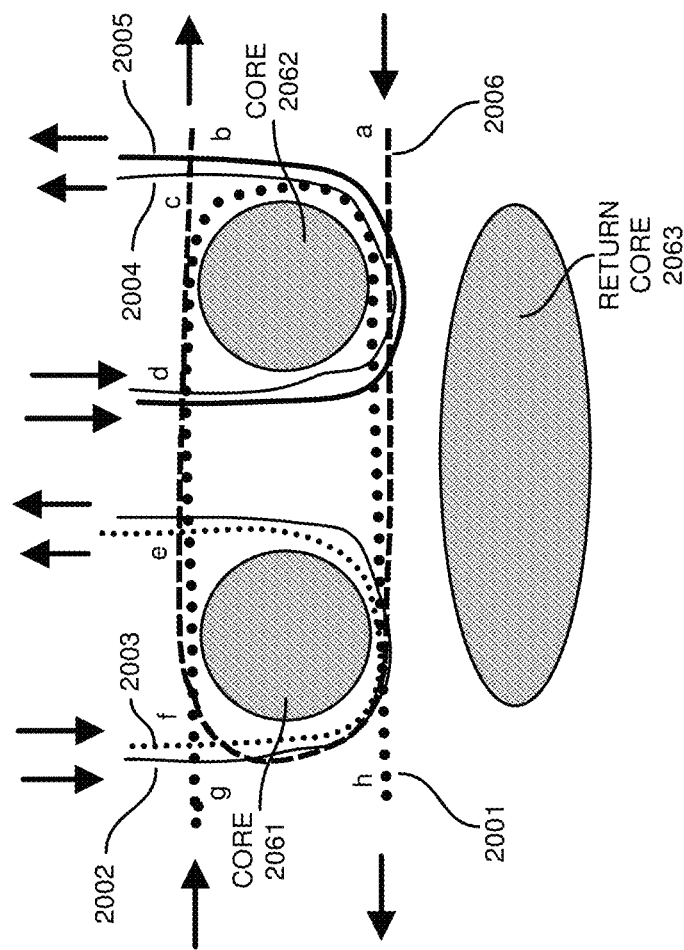
FIG. 20 is an example diagram illustrating details of a divided/split magnetic core and corresponding multiple windings according to embodiments herein.

FIG. 20 is an example top view diagram illustrating details of a divided/split magnetic core and corresponding multiple windings according to embodiments herein.

In this example embodiment, the previously implemented single magnetic core 1260 is split into two portions (such as magnetic core 2061 and magnetic core 2062) to accommodate the parallel secondary windings (2002, 2003, 2004, and 2005) for matrix multi-tapped autotransformer 160-1 of FIG. 20. Return core 2063 provides a common flux path return or continuum for a combination of the core 2061 and core 2062.

As shown in this example embodiment, each of the serially connected primary windings 2001 and 2006 are wrapped around a combination of both core 2061 and core 2062.

Each of the parallel connected secondary windings is wrapped around a respective core of the matrix multi-tapped autotransformer 160-10. For example, each of the secondary windings 2002 and 2003 is wrapped around core 2061; each of the secondary windings 2004 and 2005 is wrapped around core 2062. In accordance with further embodiments, note that both 2002 and 2003 can be wrapped around either 2061 or 2062 and the same for both 2004 and 2005. Moreover, this case is shown in FIGS. 21A, 22A and 23A. Accordingly, in general, a MMTA (matrix multi-tapped autotransformer) with two elemental autotransformer M=2 can be made in such way.

Accordingly, the FIG. 20 shows an instantiation of the matrix multi-tapped autotransformer illustrated in FIG. 19.

Note further that the magnetic core 1260 can be split to include any number of magnetic cores supporting any number of secondary windings connected in parallel.

FIG. 21A is an example diagram illustrating implementation of a matrix multi-tapped autotransformer (a.k.a., MMTA) and corresponding first view according to embodiments herein.

In this example embodiment, N1=1 (Neq1=2) and N2=1, M=2. In other words, the instantiation of matrix multi-tapped autotransformer 160-11 includes two serially connected primary windings 2001 (such as of N1 turns) and one secondary winding 2002 (such as N2 turns) between nodes c and d and one secondary winding 2004 (such as N2 turns) between nodes e and f. There is no winding 2003 or winding 2005 in this example embodiment.

Figure 21B:
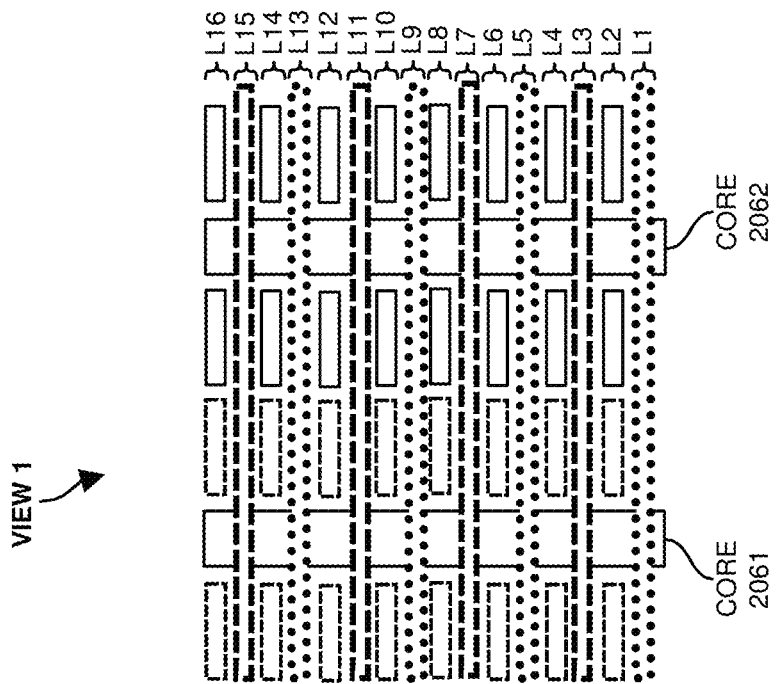
FIG. 21B is an example side view illustrating windings in a matrix multi-tapped autotransformer device according to embodiments herein.
Figure 21A:
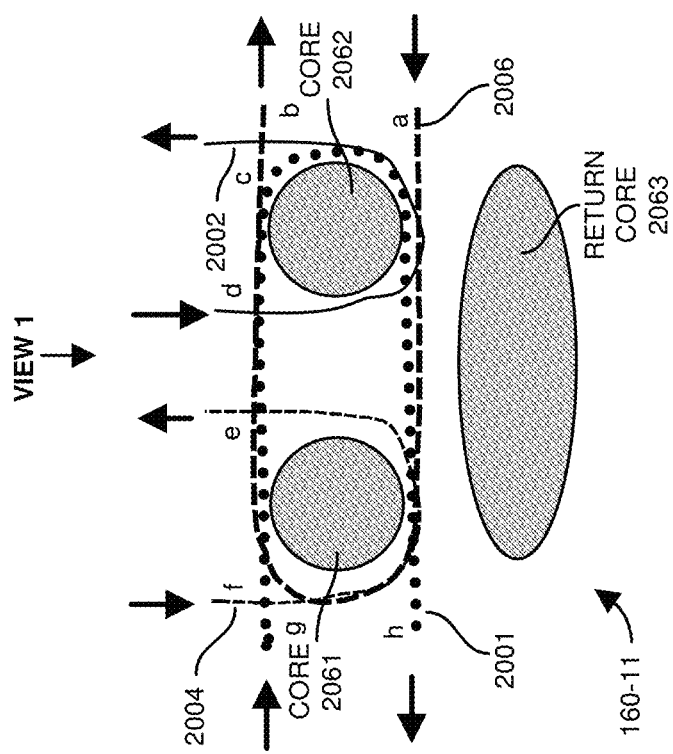
FIG. 21A is an example top view illustrating implementation of a matrix multi-tapped autotransformer device according to embodiments herein.

FIG. 21B is an example diagram illustrating a side view of windings associated with FIG. 21A according to embodiments herein.

As shown in side view #1 of transistor 160-11 in FIG. 21A, each of the layers L1, L2, L3, etc., (as shown in FIG. 21B) includes one or more primary windings and secondary windings.

For example, each of the layers L1, L5, L9, L13, etc., includes primary winding 2001 wrapped around both core 2061 and 2062 as a continuous wire between nodes g and h (FIG. 19); each of the layers L3, L7, L11, L15, etc., includes primary winding 2006 wrapped around both core 2061 and 2062 as a continuous wire between nodes a and b (FIG. 19).

Each of the layers L2, L4, L6, L8, etc., includes secondary winding 2002 wrapped around core 2062 as a continuous wire between nodes c and d (FIG. 19); each of the layers L2, L4, L6, L8, etc., also includes secondary winding 2004 wrapped around core 2061 as a continuous wire between nodes e and f (FIG. 19).

FIG. 22A is an example diagram illustrating implementation of a matrix multi-tapped autotransformer and corresponding first view according to embodiments herein.

In this example embodiment, as previously discussed, N1=1 (Neq1=2) and N2=1, where M=2. In other words, the instantiation of matrix multi-tapped autotransformer 160-11 includes two serially connected primary windings (N1) and one secondary winding (N2) between nodes content and d and one secondary winding (N2) between nodes e and f.

Figure 22B:
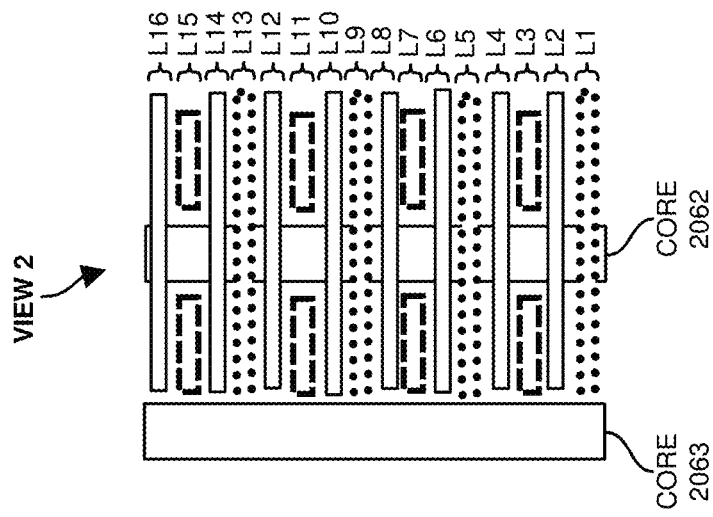
FIG. 22B is an example side view illustrating windings in a matrix multi-tapped autotransformer device according to embodiments herein.
Figure 22A:
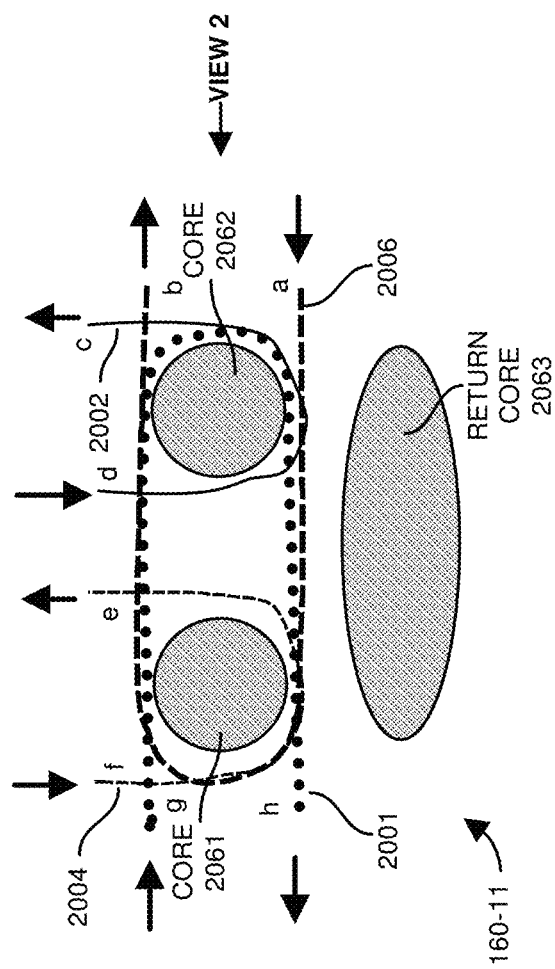
FIG. 22A is an example top view illustrating implementation of a matrix multi-tapped autotransformer device according to embodiments herein.

FIG. 22B is an example diagram illustrating a side view of windings associated with FIG. 21A according to embodiments herein.

As shown in side view #2 of matrix multi-tapped autotransformer 160-11 in FIG. 22A, each of the layers L1, L2, L3, etc., (as shown in FIG. 22B) includes a portion of a primary winding or secondary winding.

For example, each of the layers L1, L5, L9, L13, etc., includes primary winding 2001 wrapped around both core 2062 and core 2061 (hidden from view by core 2062) as a continuous wire between nodes g and h (FIG. 19); each of the layers L3, L7, L11, L15, etc., includes primary winding 2006 wrapped around both core 2062 and core 2061 (hidden from view by core 2062) as a continuous wire between nodes a and b (FIG. 19).

In view #2, each of the layers L2, L4, L6, L8, etc., includes secondary winding 2004 wrapped around core 2062 as a continuous wire between nodes c and d (FIG. 19).

FIG. 23A is an example diagram illustrating implementation of a matrix multi-tapped autotransformer and corresponding first view according to embodiments herein.

In this example embodiment, N1=1 (Neq1=2) and N2=1, where M=2. In other words, the instantiation of matrix multi-tapped autotransformer 160-11 includes two serially connected primary windings (N1) and one secondary winding (N2) between nodes content and d and one secondary winding (N2) between nodes e and f.

Figure 23B:
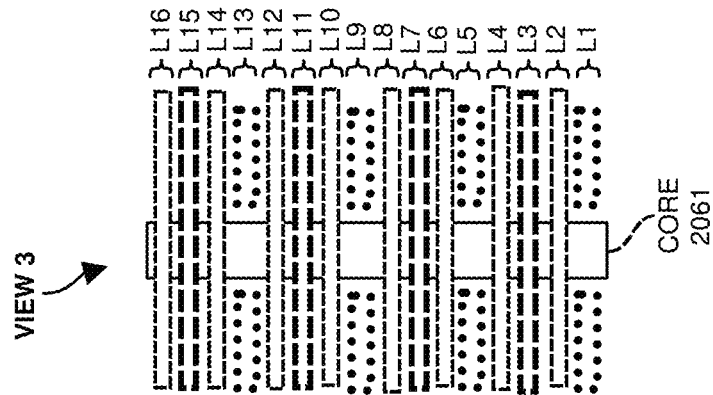
FIG. 23B is an example side view illustrating windings in a matrix multi-tapped autotransformer device according to embodiments herein.
Figure 23A:
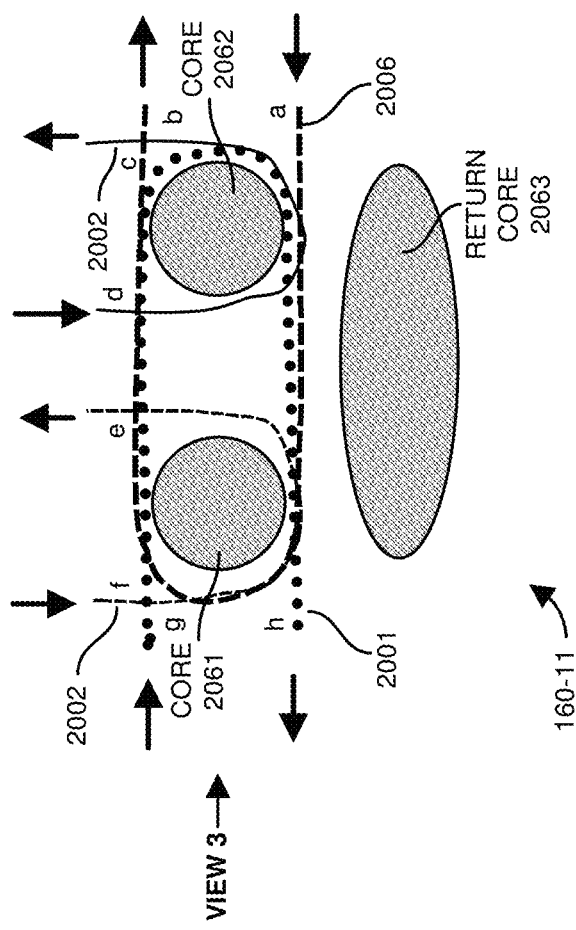
FIG. 23A is an example top view illustrating implementation of a matrix multi-tapped autotransformer device according to embodiments herein.

FIG. 23B is an example diagram illustrating a side view of windings associated with FIG. 21A according to embodiments herein.

As shown in side view #3 of matrix multi-tapped autotransformer 160-11 in FIG. 23A, each of the layers L1, L2, L3, etc., as shown in FIG. 23B includes a portion of a primary winding or secondary winding.

For example, each of the layers L1, L5, L9, L13, etc., includes primary winding 2001 wrapped around both core 2061 and core 2062 (hidden from view by core 2061) as a continuous wire between nodes g and h (FIG. 19); each of the layers L3, L7, L11, L15, etc., includes primary winding 2006 wrapped around both core 2061 and core 2062 (hidden from view by core 2061) as a continuous wire between nodes a and b (FIG. 19).

In view #3, each of the layers L2, L4, L6, L8, etc., includes secondary winding 2002 wrapped around core 2061 as a continuous wire between nodes e and f (FIG. 19).

Figure 24:
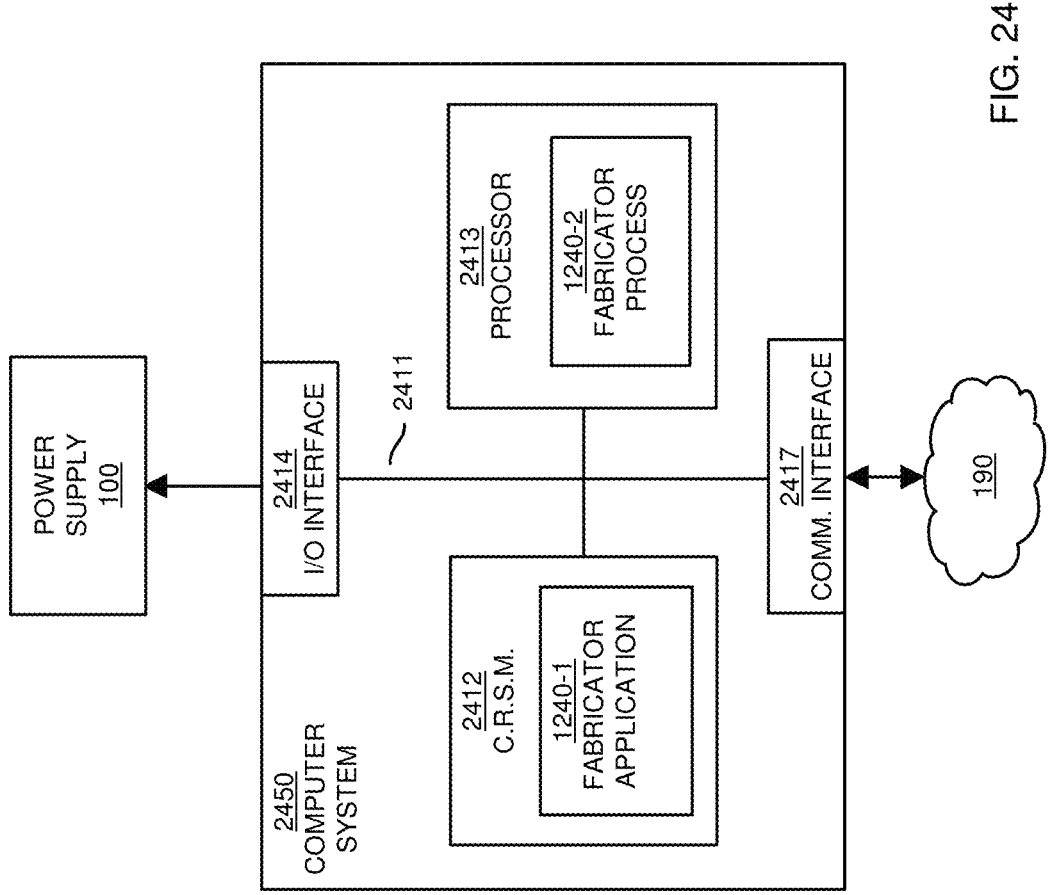
FIG. 24 is an example diagram illustrating computer architecture operable to execute one or more fabrication operations according to embodiments herein.

FIG. 24 is an example block diagram of a computer system for implementing any of the operations as previously discussed according to embodiments herein.

As previously discussed, any of the resources (such as fabricator 2440, etc.) as discussed herein can be configured to include computer processor hardware and/or corresponding executable instructions to carry out the different operations as discussed herein.

As shown, computer system 2450 of the present example includes an interconnect 2411 that provides coupling of computer readable storage media 2412 such as a non-transitory type of media (which can be any suitable type of hardware storage medium in which digital information can be stored and retrieved), a processor 2413 (computer processor hardware), I/O interface 2414, and a communications interface 2417.

I/O interface(s) 2414 supports connectivity to repository 2480 and input resource 2492 (such as a keyboard, or other resource).

Computer readable storage medium 2412 can be any hardware storage device such as memory, optical storage, hard drive, floppy disk, etc. In one embodiment, the computer readable storage medium 2412 stores instructions and/or data.

As shown, computer readable storage media 2412 can be encoded with fabricator application 1240-1 (e.g., including instructions) to carry out any of the operations as discussed herein.

During operation of one embodiment, processor 2413 accesses computer readable storage media 2412 via the use of interconnect 2411 in order to launch, run, execute, interpret or otherwise perform the instructions in fabricator application 1240-1 stored on computer readable storage medium 2412. Execution of the controller application 1240-1 produces fabricator process 1240-2 to carry out any of the operations and/or processes as discussed herein.

Those skilled in the art will understand that the computer system 2450 can include other processes and/or software and hardware components, such as an operating system that controls allocation and use of hardware resources to execute fabricator application 1240-1.

In accordance with different embodiments, note that computer system may reside in any of various types of devices, including, but not limited to, a power supply, switched-capacitor converter, power converter, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 2450 may reside at any location or can be included in any suitable resource in any network environment to implement functionality as discussed herein.

Functionality supported by the different resources will now be discussed via flowchart in FIG. 25. Note that the steps in the flowcharts below can be executed in any suitable order.

Figure 25:
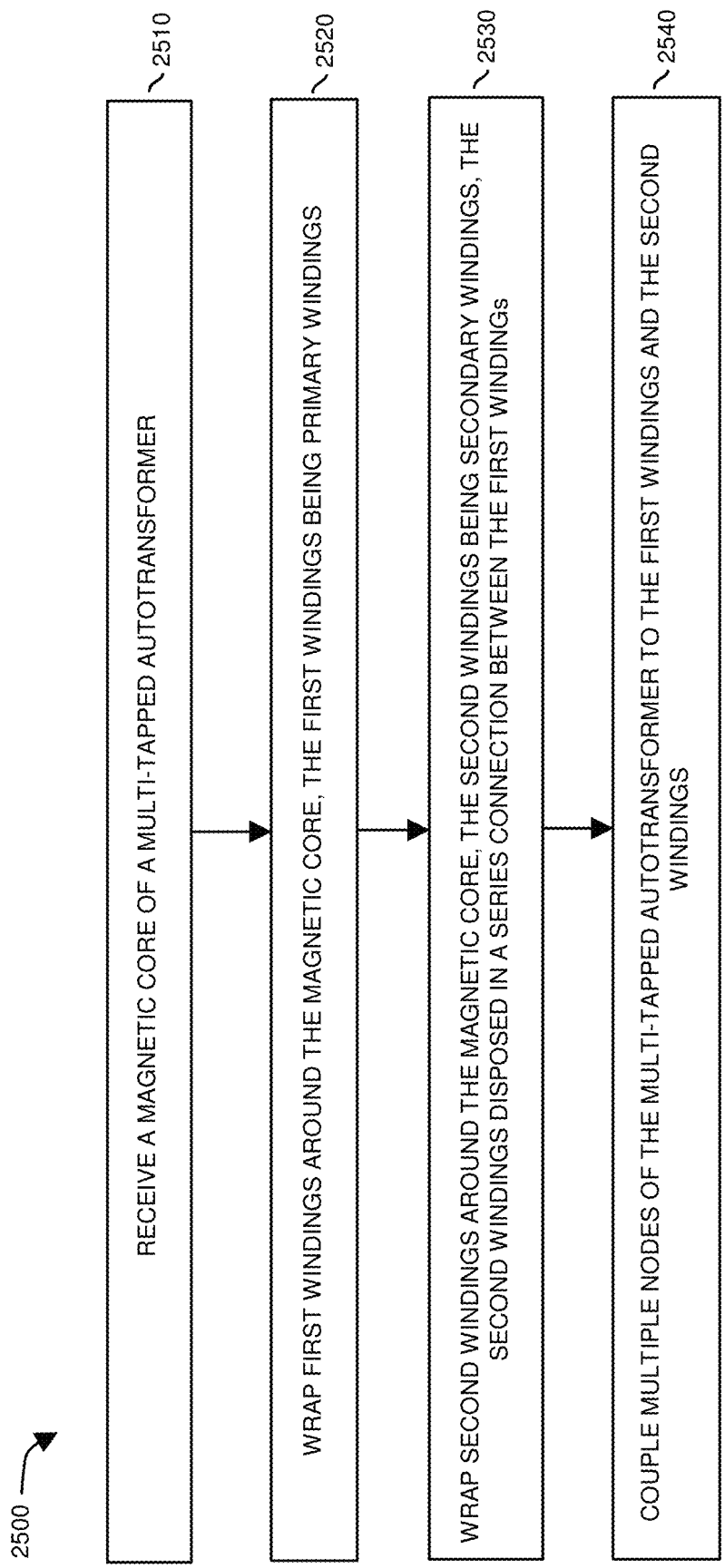
FIG. 25 is an example diagram illustrating a general method according to embodiments herein.

FIG. 25 is a flowchart 2500 illustrating an example method according to embodiments herein. Note that there will be some overlap with respect to concepts as discussed above.

In processing operation 2510, the fabricator 1240 receives a multi-tapped autotransformer magnetic core 1250.

In processing operation 2520, the fabricator 1240 wraps first windings 161 around the magnetic core 1260, the first windings being primary windings (such as windings 161, 2001, and/or 2006).

In processing operation 2530, the fabricator 1240 wraps second windings 162 around the magnetic core 1260, the second windings being secondary windings (162, 2002, 2003, 2004, and/or 2005), the second windings disposed in a series connection between the first windings.

In processing operation 2540, the fabricator 1240 couples multiple output nodes (such as tap nodes, pins, pads, etc.) of the matrix multi-tapped autotransformer 160 to the first windings and the second windings.

Embodiments herein enable an easy to use, highly efficient and power dense converter, by combining capacity and magnetic energy transfer. The switched capacitor circuitry allows use of lower voltage MOSFETs with a better FOM compared to other solutions. The implemented matrix multi-tapped autotransformer enables reduction of overall windings losses and even provides the possibility for high input to output ratios and soft charging of the resonant capacitors over the leakage inductance. In addition, embodiments herein provide zero voltage switching load independent over L_zvs, in parallel to the secondary windings of the matrix multi-tapped autotransformer or with the integrated matrix multi-tapped inductance.

Note again that techniques herein are well suited for use in multi-tapped autotransformer and power supply applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
    first windings, the first windings being primary windings of a multi-tapped autotransformer;
    second windings, the second windings being secondary windings of the multi-tapped autotransformer;
    a magnetic core around which the first windings and the second windings are wrapped, the second windings disposed in a series connection between the first windings; and
    multiple tap nodes coupled to the first windings and the second windings.

2. The apparatus as in claim 1, wherein the first windings include a first primary winding and a second primary winding; and
    wherein the second windings are connected in series between the first primary winding and the second primary winding.

3. The apparatus as in claim 2, wherein each of the first primary winding and the second primary winding are operable to receive energy supplied from an input voltage source, the energy conveyed from the first windings to the second windings producing an output voltage.

4. The apparatus as in claim 1, wherein the first windings are operable to receive energy from an input voltage source; and
    wherein the second windings are operable to receive energy from the primary windings through the magnetic core and generate an output voltage to power a load.

5. The apparatus as in claim 1, wherein the multiple tap nodes include first tap nodes and second tap nodes, the first tap nodes disposed opposite the second tap nodes with respect to a body of the magnetic core;
    wherein the first tap nodes are coupled to the first windings; and
    wherein the second tap nodes are coupled to the second windings.

6. The apparatus as in claim 1, wherein the multiple tap nodes include a set of tap nodes coupled to the second windings, the set of tap nodes disposed at an axial end of a body of the magnetic core.

7. The apparatus as in claim 1, wherein the multiple tap nodes include a set of tap nodes coupled to the second windings, the set of tap nodes residing at a location of the magnetic core in which the second windings are connected in series with respect to each other.

8. The apparatus as in claim 1, wherein each of the first windings includes an integer number of turns; and
    wherein each of the second windings includes an integer number of turns.

9. The apparatus as in claim 1, wherein each of the first windings includes a non-integer number of turns; and
    wherein each of the second windings includes an integer number of turns.

10. The apparatus as in claim 1, wherein each of the first windings includes a non-integer number of turns; and
    wherein each of the second windings includes a non-integer number of turns.

11. The apparatus as in claim 1, wherein the magnetic core includes multiple magnetic cores around which the first windings and the second windings are wound.

12. The apparatus as in claim 11, wherein each of the first windings is wound around a combination of the multiple magnetic cores; and
    wherein each of the second windings is wound around only a single magnetic core of the magnetic cores.

13. The apparatus as in claim 1, wherein the first windings include a first set of primary windings and a second set of primary windings, each of the first set of primary windings wound around a combination of the multiple magnetic cores, each of the second primary windings wound around the combination of the multiple magnetic cores; and wherein the second windings include a first set of secondary windings and a second set of secondary windings, each of the secondary windings in the first set wound around only a first magnetic core of the multiple magnetic cores, each of the secondary windings in the second set wound around only a second magnetic core of the multiple magnetic cores.

14. The apparatus as in claim 1, wherein each of the first windings includes an integer number of turns; and wherein each of the second windings includes a non-integer number of turns.

15. The apparatus as in claim 1, wherein the multi-tapped autotransformer includes a transformer core comprising the magnetic core and a magnetic return path in which to carry magnetic flux passing through the magnetic core of the multi-tapped autotransformer.

16. The apparatus as in claim 15, wherein each of the first windings and the second windings pass through a channel of the transformer core, the channel disposed between the magnetic core and the magnetic return path.

17. The apparatus as in claim 1, wherein the multi-tapped autotransformer includes the magnetic core and multiple magnetic core returns spaced apart from the magnetic core, the multiple magnetic core returns operative to carry magnetic flux passing through the magnetic core of the multi-tapped autotransformer.

18. The apparatus as in claim 17, wherein the magnetic core returns include a first magnetic core return and a second magnetic core return;

wherein each of the first windings and the second windings pass through a first channel of the multi-tapped autotransformer, the first channel disposed between the magnetic core and the first magnetic core return; and wherein each of the first windings and the second windings pass through a second channel of the multi-tapped autotransformer, the second channel disposed between the magnetic core and the second magnetic core return.

19. The apparatus as in claim 18, wherein the first windings include a first primary winding and a second primary winding;

wherein the second windings include a first secondary winding and a second secondary winding;

wherein a first axial end of the first primary winding extends through a first axial end of the first channel to a first terminal;

wherein a second axial end of the first primary winding extends through a first axial end of the second channel to a second terminal;

wherein a first axial end of the second primary winding extends through a second axial end of the first channel to a third terminal; and wherein a second axial end of the second primary winding extends through a second axial end of the second channel to a fourth terminal.

20. The apparatus as in claim 19, wherein a first axial end of the first secondary winding extends through the first axial end of the first channel to a fifth terminal;

wherein a second axial end of the first secondary winding extends through the first axial end of the second channel to a sixth terminal;

wherein a first axial end of the second secondary winding extends through the second axial end of the first channel to a seventh terminal; and wherein a second axial end of the second secondary winding extends through the second axial end of the second channel to an eighth terminal.

21. The apparatus as in claim 1, wherein the multi-tapped autotransformer includes a transformer core comprising the magnetic core in which to convey first magnetic flux and second magnetic flux, the first magnetic flux passing through the magnetic core in a first direction based on first current flowing through the multi-tapped autotransformer, the second magnetic flux passing through the magnetic core in a second direction based on second current flowing through the multi-tapped autotransformer.

22. The apparatus as in claim 1, wherein the first windings include a first primary winding and a second primary winding, the apparatus further comprising:

a switched-capacitor converter including a first capacitor and a second capacitor;

a first resonant circuit path including a combination of the first capacitor and the first primary winding; and a second resonant circuit path including a combination of the second capacitor and the second primary winding.

23. The apparatus as in claim 22 further comprising:

a controller operable to switch between: i) coupling the first resonant circuit path to an input voltage, and ii) coupling the second resonant circuit path to the input voltage.

24. The apparatus as in claim 1, wherein the multi-tapped autotransformer includes a transformer core comprising the magnetic core and multiple magnetic core returns in which to carry magnetic flux passing through the magnetic core of the multi-tapped autotransformer;

wherein the multiple magnetic core returns include a first magnetic core return and a second magnetic core return;

wherein the first windings include a first primary winding and a second primary winding; and wherein the second windings include a first secondary winding and a second secondary winding.

25. The apparatus as in claim 1, wherein the first windings include a first primary winding and a second primary winding;

wherein the second first windings include a first secondary winding and a second secondary winding;

wherein the multi-tapped autotransformer includes a first side and a second side, the second side disposed opposite the first side;

wherein a first axial end of the first primary winding extends to a first terminal on the first side;

wherein a second axial end of the first primary winding extends to a second terminal on the first side;

wherein a first axial end of the second primary winding extends to a third terminal on the second side;

wherein a second axial end of the second primary winding extends to a fourth terminal on the second side;

wherein a first axial end of the first secondary winding extends to a fifth terminal on the first side;

wherein a second axial end of the first secondary winding extends to a sixth terminal on the first side;

wherein a first axial end of the second secondary winding extends to a seventh terminal on the second side;

wherein a second axial end of the second secondary winding extends to an eighth terminal on the second side.

26. The apparatus as in claim 1, wherein the first windings include a first primary winding and a second primary winding;

wherein the second first windings include a first secondary winding and a second secondary winding;

wherein the multi-tapped autotransformer includes a first side and a second side, the second side disposed opposite the first side;

wherein the first primary winding extends between a first terminal and a second terminal of the multi-tapped autotransformer, the first terminal and the second terminal disposed on the first side;

wherein the second primary winding extends between a third terminal and a fourth terminal of the multi-tapped autotransformer, the third terminal and the fourth terminal disposed on the first side;

wherein the first secondary winding extends between a fifth and a sixth terminal of the multi-tapped autotransformer, the fifth and the sixth terminal disposed on the second side; and wherein the second primary winding extends between a seventh terminal and an eighth terminal of the multi-tapped autotransformer, the seventh terminal and the eighth terminal disposed on the second side.

27. The apparatus as in claim 2, wherein an output node of the multi-tapped autotransformer couples the first secondary winding and the second secondary in series, the output node operative to produce an output voltage.

28. The apparatus as in claim 27, wherein the multi-tapped autotransformer includes a first input voltage node and a second input voltage node, the first input voltage node electrically independent with respect to the second input voltage node.

29. The apparatus as in claim 28, wherein the first primary winding is disposed in series between the first input voltage node and the first secondary winding; and wherein the second primary winding is disposed in series between the second input voltage node and the second secondary winding.

30. The apparatus as in claim 29, wherein the multi-tapped autotransformer includes a first tap node and a second tap node;

wherein the first tap node couples the first primary winding to the first secondary winding; and wherein the second tap node couples the second primary winding to the first secondary winding.

31. The apparatus as in claim 30, wherein the multi-tapped autotransformer includes the magnetic core and multiple magnetic return paths spaced apart from the magnetic core, the multiple magnetic return paths operative to carry magnetic flux passing through the magnetic core of the multi-tapped autotransformer.

32. The apparatus as in claim 31, wherein the magnetic return paths include a first magnetic return path and a second magnetic return path;

wherein each of the first windings and the second windings pass through a first channel of the multi-tapped autotransformer, the first channel disposed between the magnetic core and the first magnetic return path; and wherein each of the first windings and the second windings pass through a second channel of the multi-tapped autotransformer, the second channel disposed between the magnetic core and the second magnetic return path.

33. The apparatus as in claim 32, wherein the first primary winding extends through the first channel in which a first axial end of the first primary winding terminates at a first terminal of the multi-tapped autotransformer;

wherein the first primary winding extends through the first channel in which a second axial end of the first primary winding terminates at a second terminal of the multi-tapped autotransformer;

wherein the second primary winding extends through the first channel in which a first axial end of the second primary winding terminates at a third terminal of the multi-tapped autotransformer; and wherein the second primary winding extends through the first channel in which a second axial end of the second primary winding terminates at a fourth terminal of the multi-tapped autotransformer.

34. The apparatus as in claim 33, wherein the first secondary winding extends through the first channel in which a first axial end of the first secondary winding terminates at a fifth terminal of the multi-tapped autotransformer;

wherein the first secondary winding extends through the first channel in which a second axial end of the first secondary winding terminates at a sixth terminal of the multi-tapped autotransformer;

wherein the second secondary winding extends through the first channel in which a first axial end of the second secondary winding terminates at a seventh terminal of the multi-tapped autotransformer; and wherein the second secondary winding extends through the first channel in which a second axial end of the second secondary winding terminates at an eighth terminal of the multi-tapped autotransformer.

35. The apparatus as in claim 3, wherein an output node of the multi-tapped autotransformer provides coupling of the first secondary winding and the second secondary winding, the output node operative to output the output voltage.

36. The apparatus as in claim 1, wherein the first windings include a first primary winding and a second primary winding;

wherein the second windings include a first secondary winding and a second secondary winding;

wherein the first secondary winding is directly connected to the second secondary winding via an output voltage node operative to output the output voltage;

wherein the first primary winding, the first secondary winding, the second secondary winding, and the second primary winding are connected in series in a series circuit path between a first input voltage node and a second input voltage node;

wherein the first secondary winding is disposed in series in the series circuit path between the first primary winding and the second secondary winding;

wherein the second secondary winding is disposed in series in the series circuit path between the first secondary winding and the second primary winding;

wherein the first input voltage node is operative to receive a first input voltage; and wherein the second input voltage node is operative to receive a second input voltage different than the first input voltage.

\* \* \* \* \*